US012468248B2

(12) United States Patent
Yamashita et al.

(10) Patent No.: US 12,468,248 B2
(45) Date of Patent: Nov. 11, 2025

(54) IMAGE FORMING APPARATUS

(71) Applicant: CANON KABUSHIKI KAISHA, Tokyo (JP)

(72) Inventors: Shun Yamashita, Shizuoka (JP); Atsushi Kawarago, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/771,511

(22) Filed: Jul. 12, 2024

(65) Prior Publication Data

US 2025/0021037 A1 Jan. 16, 2025

(30) Foreign Application Priority Data

Jul. 13, 2023 (JP) ................................ 2023-115210

(51) Int. Cl.
*G03G 15/23* (2006.01)
*G03G 15/00* (2006.01)

(52) U.S. Cl.
CPC ........... *G03G 15/50* (2013.01); *G03G 15/234* (2013.01); *G03G 15/6502* (2013.01); *G03G 15/6544* (2013.01); *G03G 15/6552* (2013.01); *G03G 15/6564* (2013.01); *G03G 15/657* (2013.01)

(58) Field of Classification Search
CPC ........... G03G 15/6564; G03G 15/6567; G03G 15/6579; G03G 15/50; G03G 2215/00586; G03G 15/23
See application file for complete search history.

(56) References Cited

U.S. PATENT DOCUMENTS

| | | | | |
|---|---|---|---|---|
| 2014/0016950 A1* | 1/2014 | Hitaka | G03G 15/6564 | 399/16 |
| 2014/0286659 A1* | 9/2014 | Yahagi | G03G 15/5058 | 399/72 |
| 2015/0378297 A1* | 12/2015 | Nakura | G03G 15/5029 | 399/395 |
| 2017/0235254 A1* | 8/2017 | Deno | G03G 15/16 | 399/394 |
| 2019/0079445 A1* | 3/2019 | Wakabayashi | G03G 15/6567 | |

FOREIGN PATENT DOCUMENTS

| | | |
|---|---|---|
| JP | 2001260458 A | 9/2001 |
| JP | 2003316208 A | 11/2003 |
| JP | 2004215188 A | 7/2004 |
| JP | 2012234158 A | 11/2012 |

* cited by examiner

*Primary Examiner* — Jessica L Eley
(74) *Attorney, Agent, or Firm* — Canon U.S.A., Inc. IP Division

(57) ABSTRACT

An image forming apparatus includes an image forming unit, a reversing unit, a detection unit for detecting leading and trailing edges of a sheet, and an alignment unit for aligning an image with respect to the leading edge of the sheet, and generates an output item in which a first sheet with a first image and a second sheet with a second image are stacked, a surface with the first image of the first sheet and a surface with the second image of the second sheet face each other, and a trailing edge of the first sheet and a leading edge of the second sheet face each other. The alignment unit corrects a position of the second image with respect to the leading edge of the second sheet during formation of the second image based on a detection result of the trailing edge of the first sheet.

14 Claims, 15 Drawing Sheets

IMAGE FORMING APPARATUS

BACKGROUND

Field of the Disclosure

The present disclosure relates to an image forming apparatus for forming an image on a sheet.

Description of the Related Art

In a printed output item that is viewed in an open spread, such as a booklet, image positions on two pages (facing pages) that are adjacent to each other are desirably aligned with each other when viewed in an open spread. Japanese Patent Application Laid-Open No. 2004-215188 discusses a technique in an open spread mode of switching the front and back of image data, forming an image on every other sheet, reversing the sheet, and discharging the reversed sheet. According to Japanese Patent Application Laid-Open No. 2004-215188, in a case where, for example, an image (front surface image) is formed on one of the facing pages through an image forming process performed for the first time in two-sided printing, a front surface image is also formed on another one of the facing pages, so that matching front or back surface images are on the facing pages. This reduces misalignments of image positions due to a mismatch of an image drawing start reference position between the front surface (leading edge of the sheet) and the back surface (trailing edge of the sheet).

SUMMARY

Embodiments of the present disclosure are directed to providing a new technology for reducing misalignments of image positions in an open spread.

According to embodiments of the present disclosure, an image forming apparatus includes an image forming unit configured to form an image on a sheet at an the image forming portion, a reversing unit configured to reverse the sheet having passed through the image forming portion to convey the sheet to the image forming portion again, a detection unit configured to detect a leading edge of the sheet and a trailing edge of the sheet in a sheet conveyance direction, and an alignment unit configured to align the image that the image forming unit forms on the sheet with the leading edge of the sheet based on a detection result of the leading edge of the sheet by the detection unit. The image forming apparatus is configured to generate an output item in which a first sheet with a first image formed thereon by the image forming unit and a second sheet with a second image formed thereon by the image forming unit are stacked, a surface with the first image of the first sheet and a surface with the second image of the second sheet face each other, and a trailing edge of the first sheet during formation of the first image and a leading edge of the second sheet during formation of the second image face each other. The alignment unit corrects a position of the second image with respect to the leading edge of the second sheet during formation of the second image based on a detection result of the trailing edge of the first sheet by the detection unit during formation of the first image by the detection unit.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

Figure 1:
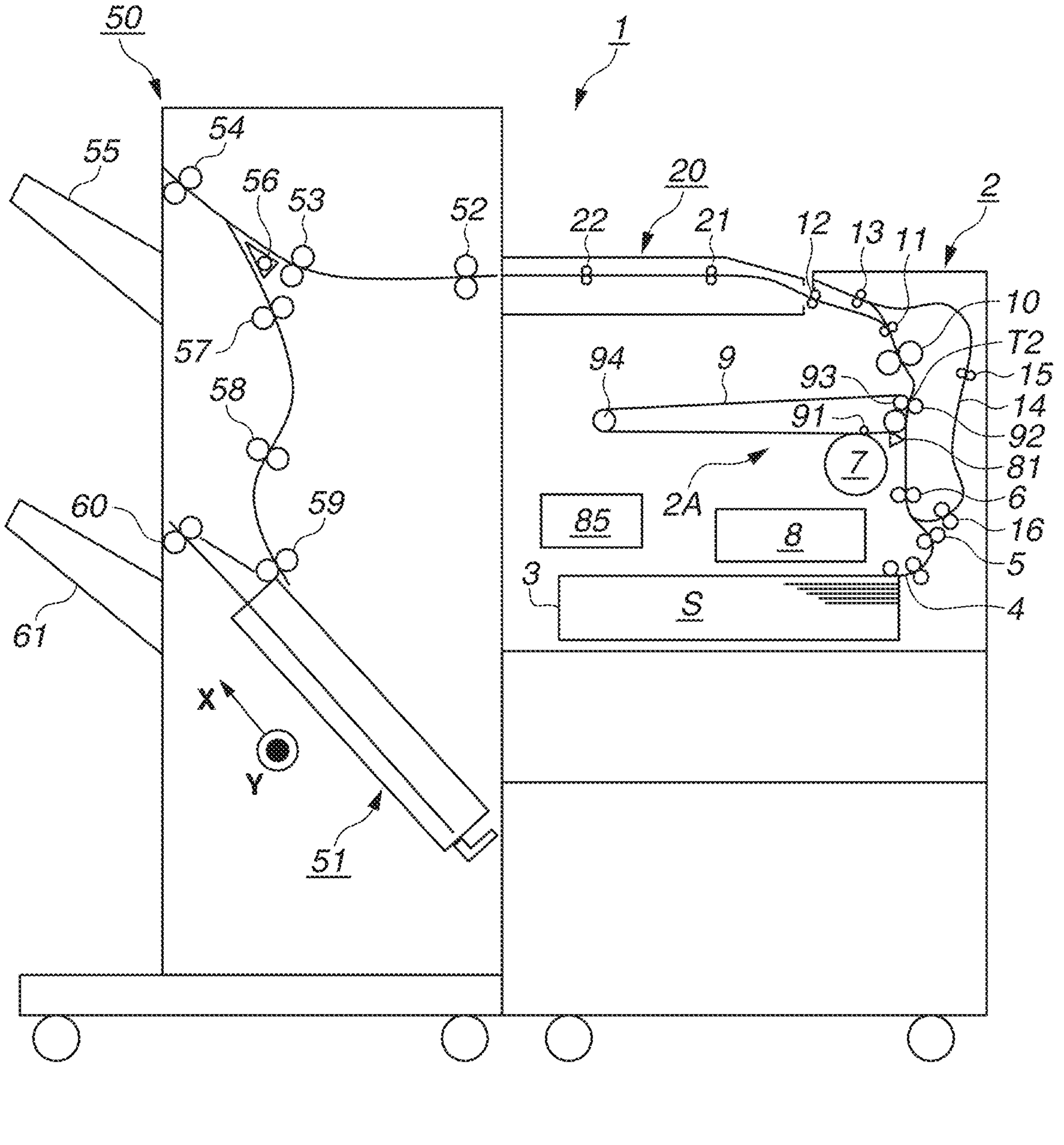
FIG. 1 is an overview diagram illustrating an image forming apparatus according to a first exemplary embodiment.

FIG. 1 is a schematic cross-sectional view illustrating an image forming apparatus 1 according to a first exemplary embodiment. The image forming apparatus 1 is an image forming system including an image forming apparatus body (hereinafter, referred to as "apparatus body 2") and a sheet processing apparatus 50 connected to the apparatus body 2 via a relay conveyance unit 20. The image forming apparatus 1 forms an image on a sheet S, which is a recording material (recording medium), based on image information input from an external device, performs processing on the sheet S as needed using the sheet processing apparatus 50, and discharges the sheet S as an output item. Various sheet materials of different sizes and different materials can be used as the sheet S, such as plain paper and thick paper, plastic film, cloth, surface-treated sheet material such as coated paper, and a special-shaped sheet material such as an envelope or index paper.

(Apparatus Body)

The apparatus body 2 includes a sheet feed cassette 3, a sheet feed roller 4, a conveyance roller pair 5, a conveyance roller pair 6, an image forming unit 2A, a fixing device 10, a conveyance roller pair 11, a discharge roller pair 12, a reverse roller pair 13, a conveyance roller pair 15, and a conveyance roller pair 16. The apparatus body 2 also includes a control unit 85 and a sheet detection unit 81.

The sheet feed cassette 3 is a storage portion in which the sheets S are stacked and stored. The sheet feed roller 4 is a sheet feed unit configured to feed the sheets S one by one. The conveyance roller pairs 5, 6, 11, 15, and 16, the discharge roller pair 12, and the reverse roller pair 13 are conveyance units for conveying the sheet S along a conveyance path in the apparatus body 2. The conveyance roller pair 6 is positioned immediately before a secondary transfer portion T2 in a sheet conveyance direction. The conveyance roller pair 6 is also referred to as a registration roller pair for aligning (registering) a leading edge of an image with a leading edge of the sheet S in the sheet conveyance direction (sub-scanning direction). The conveyance roller pair 6 also functions as a skew correction unit that corrects skew of the sheet S by aligning a leading edge of the sheet S against a nip portion of the conveyance roller pair 6 in a stopped state.

The discharge roller pair 12 is a discharge unit to discharge the sheet S from the apparatus body 2. The reverse roller pair 13 is an example of a reversing unit configured to reverse the sheet S having passed through the image forming unit 2A to convey the sheet S to the image forming unit 2A again. The reverse roller pair 13 is provided separately from the discharge roller pair 12 according to the present exemplary embodiment, however, the discharge roller pair 12 may be configured as a reversing unit to reverse and convey the sheet S.

The image forming unit 2A is an example of an image forming unit that forms an image on the sheet S. The image forming unit 2A according to the present exemplary embodiment is an electrophotographic unit using an intermediate transfer method. Specifically, the image forming unit 2A according to the present exemplary embodiment includes a photosensitive drum 7 as an image bearing member, a laser scanner 8 as an exposure unit, intermediate transfer belt 9 as an intermediate transfer member, and a secondary transfer roller 92 as a transfer unit. The photosensitive drum 7 is an electrophotographic photosensitive member including a cylindrical base and a photosensitive layer formed using an organic photosensitive material around the outer periphery of the cylindrical base. Near the photosensitive drum 7, a charging device (not illustrated) and a development device (not illustrated) are disposed. The laser scanner 8 includes an oscillator and an exposure optical system. The oscillator emits laser light, and the exposure optical system guides the laser light to the photosensitive drum 7 and scans the laser light in a rotational axis direction (main scanning direction) of the photosensitive drum 7. The laser scanner 8 is an example of an exposure unit and may use, for example, a light emitting diode (LED) exposure device in which LEDs are arrayed in the main scanning direction. The intermediate transfer belt 9 is placed around a plurality of rollers 93 and 94. A primary transfer roller 91 is placed on the inner periphery side of the intermediate transfer belt 9. The secondary transfer roller 92 is disposed such that the intermediate transfer belt 9 is sandwiched between the secondary transfer roller 92 and the roller 93 (secondary transfer inner roller). The secondary transfer portion T2 is formed as a nip portion between the secondary transfer roller 92 and the intermediate transfer belt 9. The secondary transfer portion T2 is an example of an image forming portion where an image is formed on the sheet S.

The fixing device 10 includes a heating member, a pressing member, and a heating unit. The heating member and the pressing member form a nip portion (fixing nip), and the heating unit heats the heating member. The heating member is, for example, a roller member having rigidity or a tubular film member having flexibility. The heating unit may use a halogen lamp that emits radiant heat or a heater substrate including a heat generating resistor.

Figure 9:
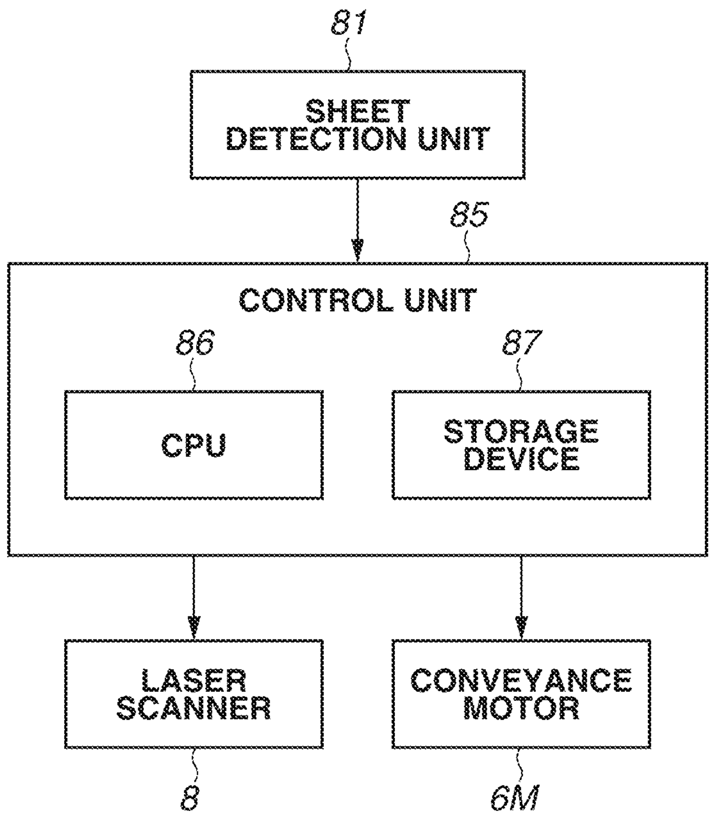
FIG. 9 is a diagram illustrating a control unit according to the first exemplary embodiment.

The control unit 85 is a control unit for controlling the image forming apparatus 1. The control unit 85 includes a central processing unit (CPU) 86 and a storage device 87 as illustrated in FIG. 9. The CPU 86 executes programs for controlling the image forming apparatus 1, and the storage device 87 stores programs and data (e.g., condition settings for image forming operation) for controlling the image forming apparatus 1. The CPU 86 reads programs from the storage device 87 and executes the read programs to control the components of the apparatus body 2 and the sheet processing apparatus 50, whereby the control unit 85 controls the image forming apparatus 1. Control targets include the laser scanner 8 and a conveyance motor 6M for driving the conveyance roller pair 6.

The control unit 85 performs, for example, alignment (leading edge registration) of an image to be transferred onto the sheet S at the secondary transfer portion T2 with the leading edge of the sheet S in the sheet conveyance direction based on detection results of the sheet detection unit 81. Specifically, the control unit 85 functions as an alignment unit that aligns an image to be formed on a sheet by the image forming unit with a leading edge of the sheet. The control unit 85 performs leading edge registration by, for example, adjusting a start timing of drawing of an electrostatic latent image on the photosensitive drum 7 by the laser scanner 8 (hereinafter, the timing will be referred to as "exposure drawing start timing"). By adjusting the exposure drawing start timing, a starting point of the electrostatic latent image in the sub-scanning direction of the photosensitive drum 7 changes, making it possible to control the image position with respect to the sheet S. The control unit 85 may perform leading edge registration by adjusting an arrival timing of the leading edge of the sheet S at the secondary transfer portion T2 by controlling the speed of the conveyance roller pair 6, instead of adjusting the exposure drawing start timing, or along with adjusting the exposure drawing start timing.

While the control unit 85 directly controls operations of the sheet processing apparatus 50 according to the present exemplary embodiment, the sheet processing apparatus 50 may include a second control unit. In this case, the second control unit controls operations of the sheet processing apparatus 50 based on instructions from the control unit 85 of the apparatus body 2.

The sheet detection unit 81 is an example of a detection unit that detects leading and trailing edges of the sheet S in the sheet conveyance direction. The leading edge of the sheet S herein refers to a downstream edge of the sheet S in the main sheet conveyance direction on the sheet conveyance path. The trailing edge of the sheet S refers to an upstream edge of the sheet S in the main sheet conveyance direction on the sheet conveyance path. The sheet detection unit 81 emits detection signals indicating whether the sheet S is at a predetermined position (detection position) on the sheet conveyance path. The control unit 85 detects the passing of the leading or trailing edge of the sheet S at the detection position based on a change in the detection signals emitted by the sheet detection unit 81.

The sheet detection unit 81 according to the present exemplary embodiment is provided to detect the sheet S at a position between the conveyance roller pair 6 (upstream roller pair) situated upstream of the secondary transfer portion T2 in the sheet conveyance direction and the secondary transfer portion T2. The sheet detection unit 81 may be situated to detect the sheet S at substantially the same position as the nip portion of the conveyance roller pair 6 in the sheet conveyance direction. The sheet detection unit 81 may also be situated to detect the sheet S at a position between a conveyance roller pair (downstream roller pair) situated downstream of the secondary transfer portion T2 in the sheet conveyance direction and the secondary transfer portion T2 or at substantially the same position as a nip portion of the downstream roller pair.

The sheet detection unit 81 may use, for example, a reflection type photoelectric sensor including a light emitting element that emits detection light to the sheet conveyance path and a light emitting element situated to receive the detection light reflected from a sheet and configured to emit a detection signal based on the amount of received light. The sheet detection unit 81 may use, for example, a flag type sensor using a combination of a flag protruding into the sheet conveyance path and configured to pivot when pressed against the sheet S and a photoelectric sensor configured to detect the pivot of the flag.

Image Forming Operation

A series of operations (image forming operation) of forming an image on the sheet S by the image forming apparatus 1 will be described below.

The image forming apparatus 1 starts the image forming operation in a case where the control unit 85 receives an instruction (print command) to execute the image forming operation and image information from an external device. If the image forming operation is started, the sheets S stacked in the sheet feed cassette 3 are separated and fed singly by the sheet feed roller 4, and each fed sheet S is conveyed to the secondary transfer portion T2 by the conveyance roller pairs 5 and 6.

Meanwhile, the image forming unit 2A starts generating a toner image using an electrophotographic process. First, the photosensitive drum 7 is driven to rotate, and the charging device uniformly charges a surface of the photosensitive drum 7. The laser scanner 8 irradiates the photosensitive drum 7 with laser light based on a video signal generated based on the image information and exposes the photosensitive drum 7. This discharges areas of the surface of the photosensitive drum 7 irradiated with laser light, forming an electrostatic latent image on the surface of the photosensitive drum 7. The development device supplies toner as a developing agent to the photosensitive drum 7 and develops the electrostatic latent image as a toner image. The toner image borne on the photosensitive drum 7 is primarily transferred onto the intermediate transfer belt 9 by the primary transfer roller 91. The toner image on the intermediate transfer belt 9 is conveyed to the secondary transfer portion T2 as the intermediate transfer belt 9 is rotated. The toner image is then secondarily transferred from the intermediate transfer belt 9 onto a first surface of the sheet S conveyed to the secondary transfer portion T2 by a bias electric field formed by the secondary transfer roller 92. Specifically, the image is formed on the first surface of the sheet S at the secondary transfer portion T2 as the image forming portion.

The sheet S having passed through the secondary transfer portion T2 is subjected to a toner image fixing process by the fixing device 10. The fixing device 10 heats and pressurizes the image on the sheet S while gripping the sheet S by the fixing nip and conveying the sheet S.

In one-sided image forming (one-sided printing), where an image is formed only on one side of the sheet S, the sheet S having passed through the fixing device 10 is conveyed from the conveyance roller pair 11 to the discharge roller pair 12 and discharged to the relay conveyance unit 20 by the discharge roller pair 12. The relay conveyance unit 20 discharges the sheet S to the sheet processing apparatus 50 using conveyance roller pairs 21 and 22.

In two-sided image forming (two-sided printing), where an image is formed on both sides of the sheet S, the sheet S having passed through the fixing device 10 is conveyed from the conveyance roller pair 11 to the reverse roller pair 13. The reverse roller pair 13 performs reverse conveyance (switch back) of the sheet S and conveys the sheet S to a two-sided conveyance path 14. The reverse conveyance is referred to as an operation of conveying the sheet S in a first conveyance direction toward the outside the apparatus body by the reverse roller pair 13 and conveying the sheet S in a second conveyance direction opposite to the first conveyance direction by switching a rotation direction before the trailing edge of the sheet S in the first conveyance direction exits the reverse roller pair 13.

The sheet S conveyed to the two-sided conveyance path 14 is conveyed to the conveyance roller pair 6 again by the conveyance roller pairs 15 and 16. While the sheet S passes through the secondary transfer portion T2 again, a toner image is then transferred onto a second surface opposite to the first surface of the sheet S. Specifically, an image is formed on the second surface of the sheet S at the secondary transfer portion T2 as the image forming portion.

The sheet S having passed through the secondary transfer portion T2 is subjected to the toner image fixing process by the fixing device 10. The sheet S having passed through the fixing device 10 is conveyed from the conveyance roller pair 11 to the discharge roller pair 12 and discharged to the relay conveyance unit 20 by the discharge roller pair 12. The relay conveyance unit 20 discharges the sheet S to the sheet processing apparatus 50 by using the conveyance roller pairs 21 and 22.

While the sheet S reversed by the reverse roller pair 13 passes through the secondary transfer portion T2 for the second time, the second surface of the sheet S faces the photosensitive drum 7. When the sheet S reversed by the reverse roller pair 13 passes through the secondary transfer portion T2 for the second time, the trailing edge of the sheet S in passing through the secondary transfer portion T2 for the first time before the reversal of the sheet S by the reverse roller pair 13 becomes the leading edge of the sheet S. Specifically, the reverse roller pair 13 performs reverse conveyance of the sheet S to reverse the first and second surfaces and the leading and trailing edges of the sheet S having passed through the secondary transfer portion T2 so that the sheet S with the reversed first and second surfaces and the reversed leading and trailing edges is conveyed to the secondary transfer portion T2 again.

According to the present exemplary embodiment, the "first surface" of the sheet S refers to a surface of the sheet S that faces the photosensitive drum 7 when the sheet S fed from the sheet feed cassette 3 passes through the secondary transfer portion T2 for the first time.

The "second surface" of the sheet S refers to a surface of the sheet S that faces the photosensitive drum 7 when the sheet S reversed by the reverse roller pair 13 after passing through the secondary transfer portion T2 for the first time passes through the secondary transfer portion T2 for the second time.

Sheet Processing Apparatus

The sheet processing apparatus 50 is an apparatus (post-processing apparatus, finisher) for performing processing on the sheet S with an image formed by the apparatus body 2. The sheet processing apparatus 50 according to the present exemplary embodiment is capable of binding a plurality of sheets S together to generate a sheet stack and discharging the sheet stack as an output item of the image forming apparatus 1.

The sheet processing apparatus 50 includes an entrance roller pair 52, a conveyance roller pair 53, a discharge roller pair 54, a conveyance roller pair 57, conveyance roller pairs 57, 58, and 59, a binding processing portion 51, a stack discharge roller pair 60, an upper discharge tray 55, and a lower discharge tray 61.

The entrance roller pair 52, the conveyance roller pair 53, and the discharge roller pair 54 are arranged on a first conveyance path from a receiving inlet where the sheet processing apparatus 50 receives the sheet S to the upper discharge tray 55. The conveyance roller pairs 57, 58, and 59 are arranged on a second conveyance path branched from the first conveyance path and extending to the binding processing portion 51. The stack discharge roller pair 60 is arranged on a third conveyance path from the binding processing portion 51 to the lower discharge tray 61.

The sheet processing apparatus 50 receives the sheet S from the relay conveyance unit 20 through the entrance roller pair 52 and conveys the received sheet S through the conveyance roller pair 53 to the discharge roller pair 54. In a case where no binding process is to be performed, the sheet S is discharged to the upper discharge tray 55 by the discharge roller pair 54. In a case where a binding process is to be performed, the discharge roller pair 54 performs reverse conveyance on the sheet S. In this case, the sheet S is guided to the second conveyance path by a backflow prevention member 56 and conveyed to the binding processing portion 51 by the conveyance roller pairs 57, 58, and 59. The sheets S stacked on a tray of the binding processing portion 51 are adjusted by an adjustment member of the binding processing portion 51 with respect to an X direction (conveyance direction in conveying the sheet stack to the stack discharge roller pair 60) and a Y direction perpendicular to the X direction. When a predetermined number of sheets S to be processed are stacked and adjusted, the binding processing portion 51 performs the binding process on the predetermined number of sheets S using a stapler. Consequently, a sheet stack of the predetermined number of sheets S bound together is generated. After the binding process, the sheet stack is pushed out in the X direction from the tray by a pushing member of the binding processing portion 51. The sheet stack is then discharged to the outside of the sheet processing apparatus 50 by the stack discharge roller pair 60 and stacked on the lower discharge tray 61 as an output item stacking portion.

Booklet Generation Job

Next, a booklet generation job will be described with reference to FIGS. 2A to 5B. The booklet generation job is a series of operations of the image forming apparatus 1 for continuously forming an image on the plurality of sheets S and generating a sheet stack (hereinafter, referred to as "booklet") having been subjected to the binding process. In a case where a print command is received, the control unit 85 of the image forming apparatus 1 analyzes whether information indicating an instruction to generate a booklet is included, and in a case where such an instruction is included, the control unit 85 executes the booklet generation job.

Here, an example of a booklet generation job of generating a booklet containing two sheets S will be described. Further, an example will be described below of a booklet generation job of forming an image on two facing pages (facing pages) in a booklet with a blank front cover and a blank back cover.

In the booklet generation job, the sheet S that is fed first from the sheet feed cassette 3 will be referred to as "preceding sheet S1", and the sheet S that is fed after the preceding sheet S1 from the sheet feed cassette 3 will be referred to as "subsequent sheet S2".

To generate facing pages in a booklet, the preceding sheet S1 and the subsequent sheet S2 stacked such that an image surface of the preceding sheet S1 and an image surface of the subsequent sheet S2 face each other are to undergo the binding process in the sheet processing apparatus 50. The term "image surface" is referred to as either the first or the second surface (printing surface) of the sheet S on which an image is to be formed by the booklet generation job.

Figure 2A:
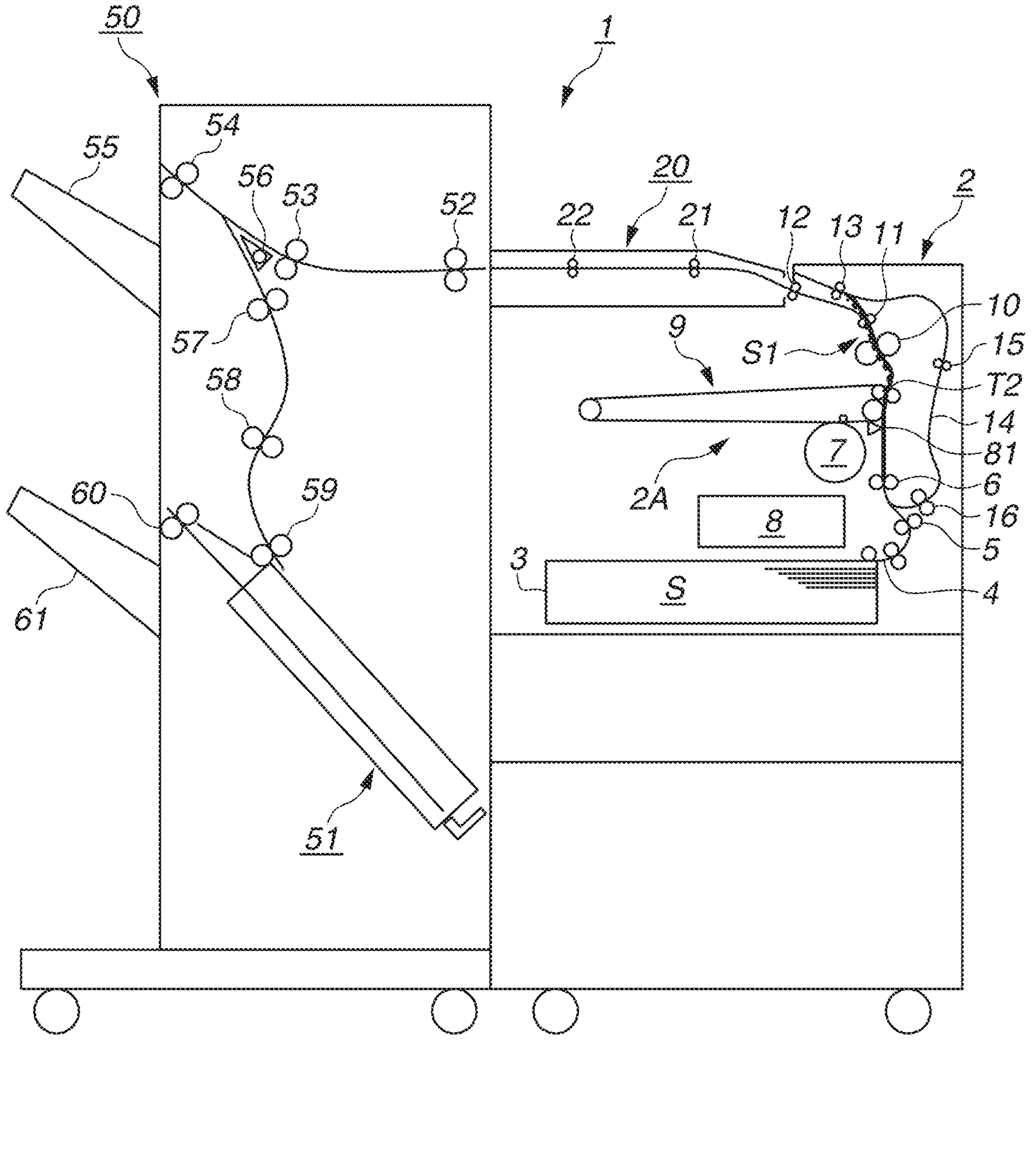
FIGS. 2A and 2B are diagrams illustrating a booklet generation job according to the first exemplary embodiment.

First, only the conveyance of the preceding sheet S1 will be described. As illustrated in FIG. 2A, the preceding sheet S1 is fed from the sheet feed cassette 3, and a toner image is transferred onto a first surface of the preceding sheet S1 at the secondary transfer portion T2. Specifically, when the preceding sheet S1 passes through the image forming portion (secondary transfer portion T2) for the first time, an image is formed on the first surface of the preceding sheet S1. Then, the toner image is fixed to the first surface by the fixing device 10.

Figure 2B:
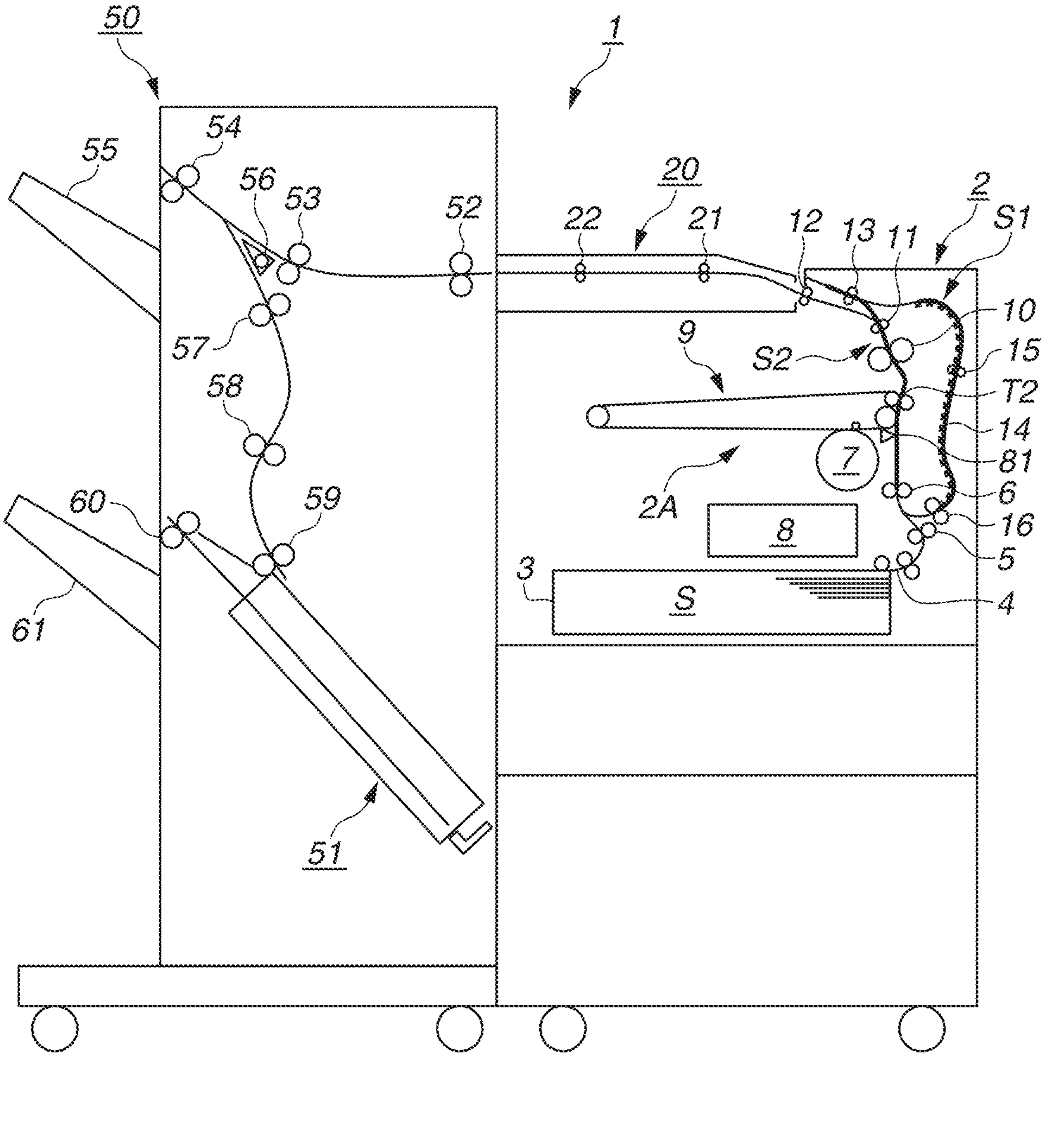

Thereafter, as illustrated in FIG. 2B, the preceding sheet S1 with the first surface with the image formed thereon is conveyed to the reverse roller pair 13 and reversed and conveyed by the reverse roller pair 13. The preceding sheet S1 is then guided through the two-sided conveyance path 14 to the conveyance roller pair 6 and conveyed to the secondary transfer portion T2 again. The reverse conveyance by the reverse roller pair 13 switches the leading and trailing edges of the preceding sheet S1 in passing through the secondary transfer portion T2.

When the preceding sheet S1 passes through the secondary transfer portion T2 again, no toner image is transferred onto the preceding sheet S1. Specifically, no image is formed on a second surface of the preceding sheet S1 when the preceding sheet S1 passes through the image forming portion (secondary transfer portion T2) for the second time.

Figure 3A:
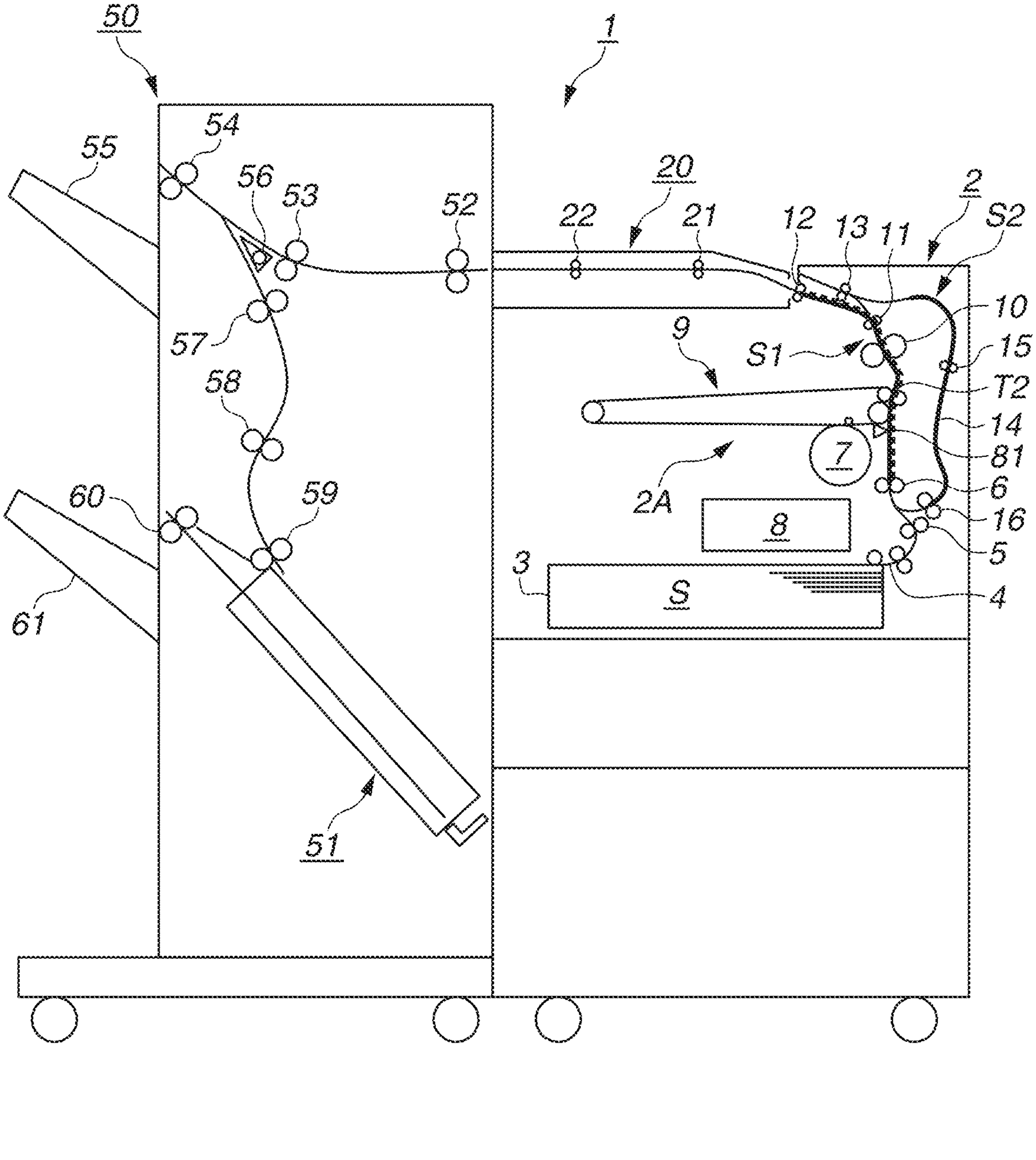
FIGS. 3A and 3B are diagrams illustrating a booklet generation job according to the first exemplary embodiment.
Figure 3B:
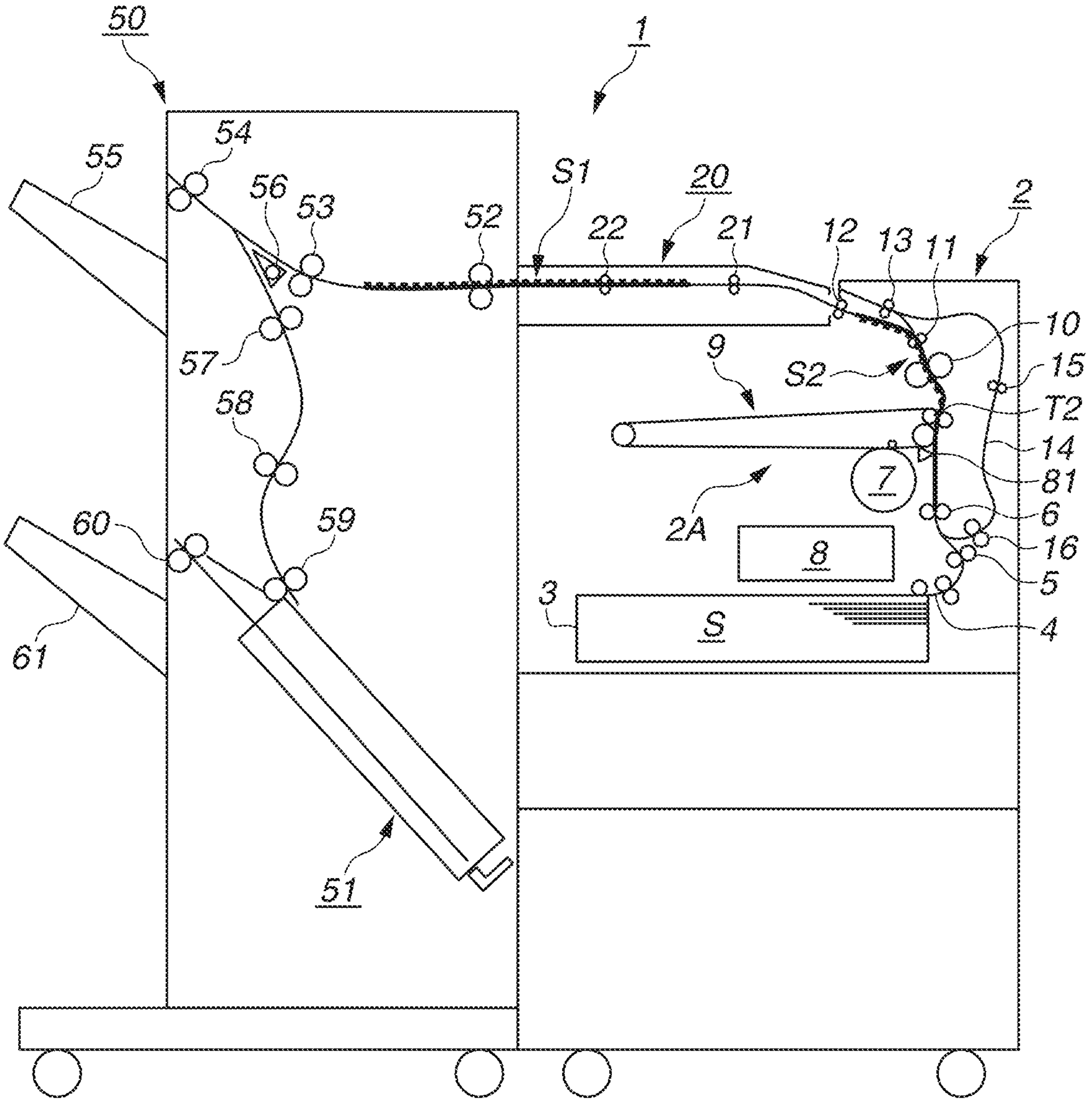

The preceding sheet S1 with the first surface with the image formed thereon and the second surface in a blank state is conveyed to the discharge roller pair 12 as illustrated in FIG. 3A. As illustrated in FIG. 3B, the preceding sheet S1 with the first surface, which is an image surface, facing upward is then conveyed through the relay conveyance unit 20 to the sheet processing apparatus 50.

In FIGS. 2A to 4B, each image surface of the preceding sheet S1 is indicated with a dashed line. For example, in FIG. 3B, the surface of the preceding sheet S1 that is facing upward is the first surface, which is an image surface, and the surface of the preceding sheet S1 that is facing downward is the second surface, which is a non-image surface (blank state).

Figure 4A:
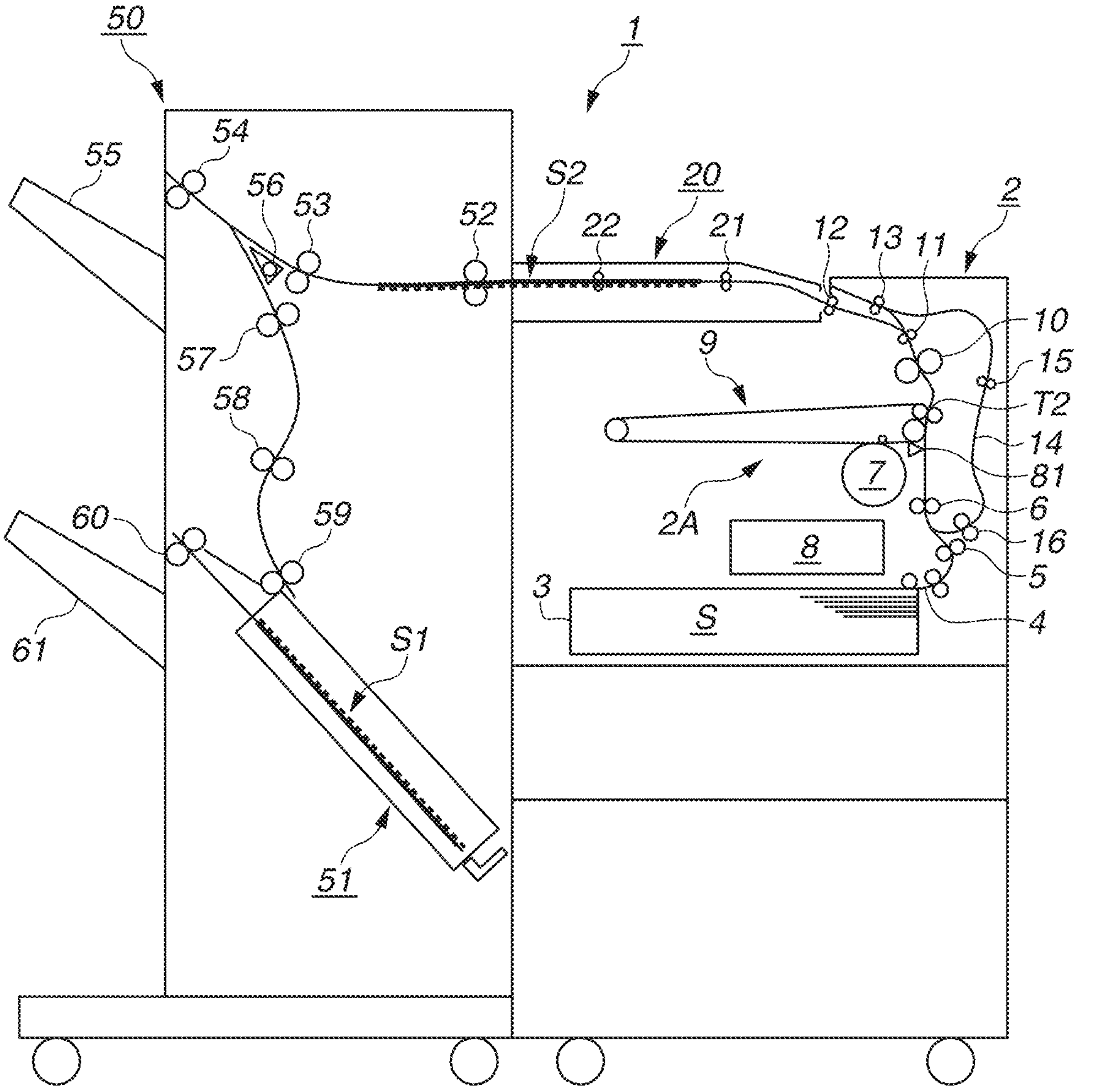
FIGS. 4A and 4B are diagrams illustrating a booklet generation job according to the first exemplary embodiment.

As illustrated in FIG. 4A, in the sheet processing apparatus 50, the preceding sheet S1 reversed and conveyed by the discharge roller pair 54 is stacked in the binding processing portion 51. The preceding sheet S1 with the first surface, which is an image surface, facing upward is stacked in the binding processing portion 51.

Next, the conveyance of the subsequent sheet S2 will be described. As illustrated in FIG. 2B, the subsequent sheet S2 is fed following the preceding sheet S1 by the sheet feed roller 4. Unlike the preceding sheet S1, the subsequent sheet S2 is conveyed in a blank state without transferring a toner image onto the subsequent sheet S2 in passing through the secondary transfer portion T2 for the first time. Specifically, no image is formed on a first surface of the subsequent sheet S2 when the subsequent sheet S2 passes through the image forming portion (secondary transfer portion T2) for the first time.

Thereafter, the subsequent sheet S2 is conveyed to the reverse roller pair 13 and reversed and conveyed by the reverse roller pair 13. The subsequent sheet S2 is then guided through the two-sided conveyance path 14 to the conveyance roller pair 6 and conveyed to the secondary transfer portion T2 again. The reverse conveyance by the reverse roller pair 13 switches the leading and trailing edges of the subsequent sheet S2 in passing through the secondary transfer portion T2.

When the subsequent sheet S2 passes through the secondary transfer portion T2 again, a toner image is transferred onto the subsequent sheet S2. Specifically, an image is formed on the second surface of the subsequent sheet S2 when the subsequent sheet S2 passes through the image forming portion (secondary transfer portion T2) for the second time. The toner image on the second surface is then fixed by the fixing device 10.

The subsequent sheet S2 with the second surface with the image formed thereon and the first surface in a blank state is conveyed to the discharge roller pair 12 as illustrated in FIG. 4A. The subsequent sheet S2 with the second surface, which is an image surface, facing downward is then conveyed through the relay conveyance unit 20 to the sheet processing apparatus 50.

Like the preceding sheet S1, each image surface of the subsequent sheet S2 is indicated with a dashed line in FIGS. 2A to 4B. For example, in FIG. 4A, the surface of the subsequent sheet S2 that is facing downward is the second surface, which is an image surface, and the surface of the subsequent sheet S2 that is facing upward is the first surface, which is a non-image surface (blank state).

Figure 4B:
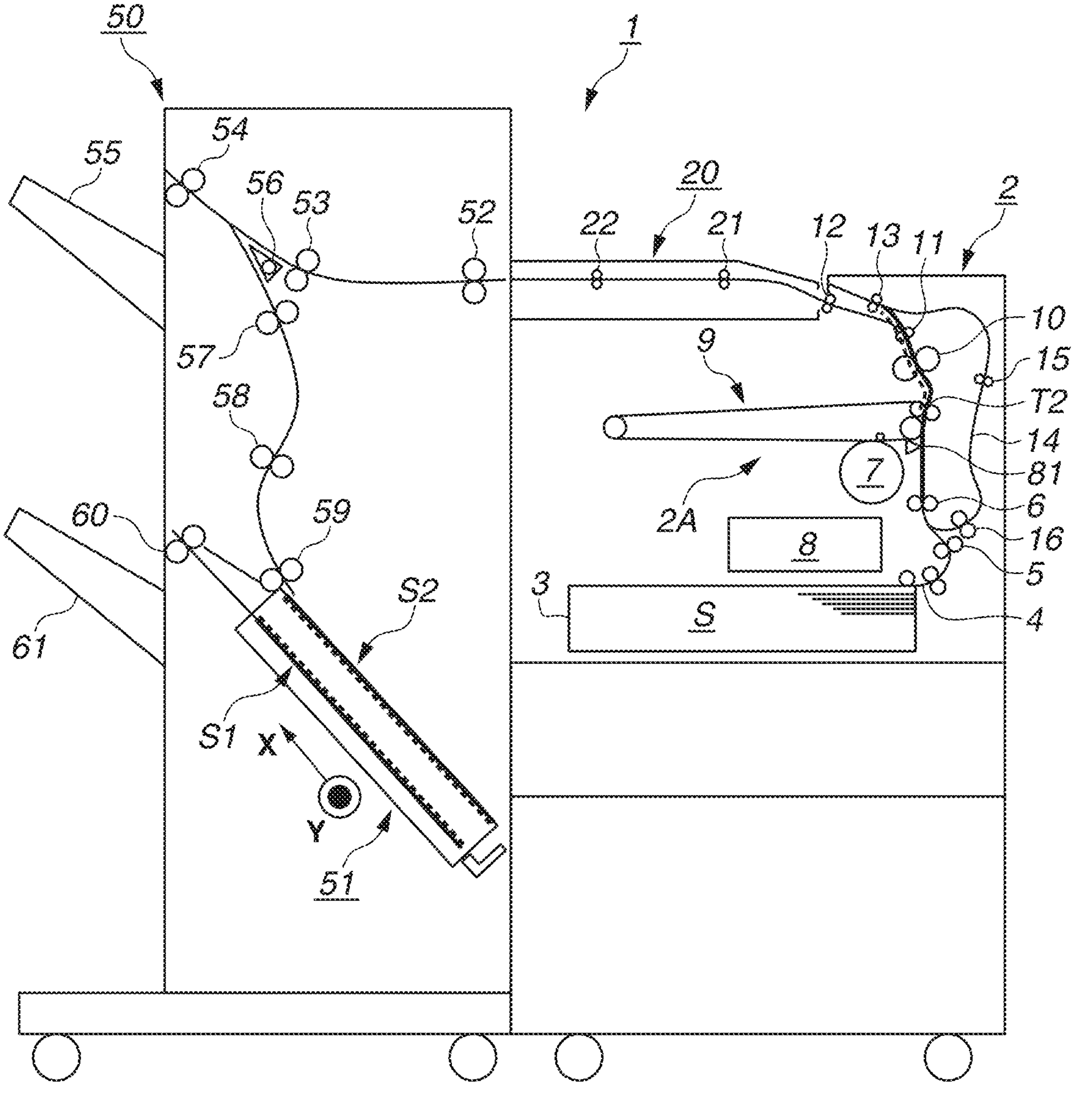

As illustrated in FIG. 4B, in the sheet processing apparatus 50, the subsequent sheet S2 reversed and conveyed by the discharge roller pair 54 is stacked in the binding processing portion 51. The subsequent sheet S2 with the second surface, which is an image surface, facing downward is stacked in the binding processing portion 51, i.e., in a state where the image surface of the preceding sheet S1 and the image surface of the subsequent sheet S2 are facing each other.

The adjustment member of the binding processing portion 51 then adjusts the preceding sheet S1 and the subsequent sheet S2 in the X and Y directions, and a binding unit performs the binding process on the preceding sheet S1 and the subsequent sheet S2 to generate a booklet. Thereafter, the booklet is discharged by the stack discharge roller pair 60 and stacked on the lower discharge tray 61.

Correspondence Relationship Between Leading and Trailing Edges of Preceding and Subsequent Sheets How the preceding sheet S1 and the subsequent sheet S2 behave at the binding processing portion 51 will be described with reference to FIGS. 5A and 5B.

Figure 5A:
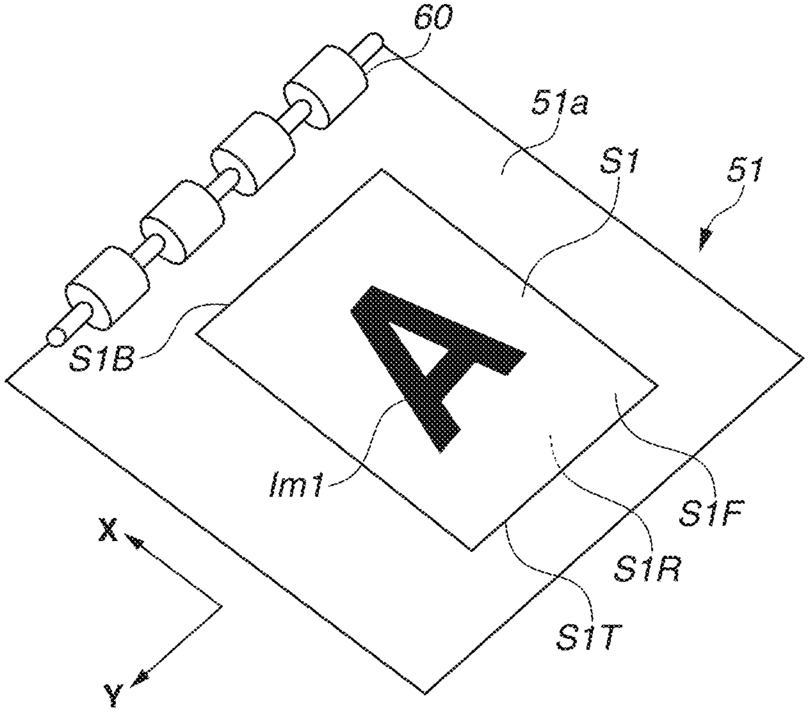
FIGS. 5A and 5B are schematic diagrams illustrating a positional relationship between sheets at a binding processing portion according to the first exemplary embodiment.

FIG. 5A is a schematic diagram illustrating the preceding sheet S1 stacked on a processing tray 51*a* of the binding processing portion 51. The processing tray 51*a* is a stacking portion (intermediate stacking portion) for stacking sheets to undergo the binding process. An image Im1 "A" is formed on a first surface S1F, which is an image surface, of the preceding sheet S1. A second surface S1R of the preceding sheet S1 is in a blank state. The preceding sheet S1 is stacked on the processing tray 51*a* with the first surface S1F facing upward and the second surface S1R facing downward and facing the processing tray 51*a*.

The leading edge of the preceding sheet S1 in the sheet conveyance direction when the preceding sheet S1 passes through the secondary transfer portion T2 for the first time will be referred to as a leading edge S1T during image transfer, and the trailing edge of the preceding sheet S1 in the sheet conveyance direction when the preceding sheet S1 passes through the secondary transfer portion T2 for the first time will be referred to as a trailing edge S1B during image transfer. According to the present exemplary embodiment, an image is formed on the preceding sheet S1 when the preceding sheet S1 passes through the secondary transfer portion T2 for the first time, and then the preceding sheet S1 is reversed by the reverse roller pair 13 and then conveyed to the sheet processing apparatus 50. Thus, in the state where the preceding sheet S1 is stacked on the binding processing portion 51, the leading edge of the preceding sheet S1 in the X direction (conveyance direction to the stack discharge roller pair 60) is the trailing edge S1B during image transfer, and the trailing edge of the preceding sheet S1 in the X direction is the leading edge S1T during image transfer.

Figure 5B:
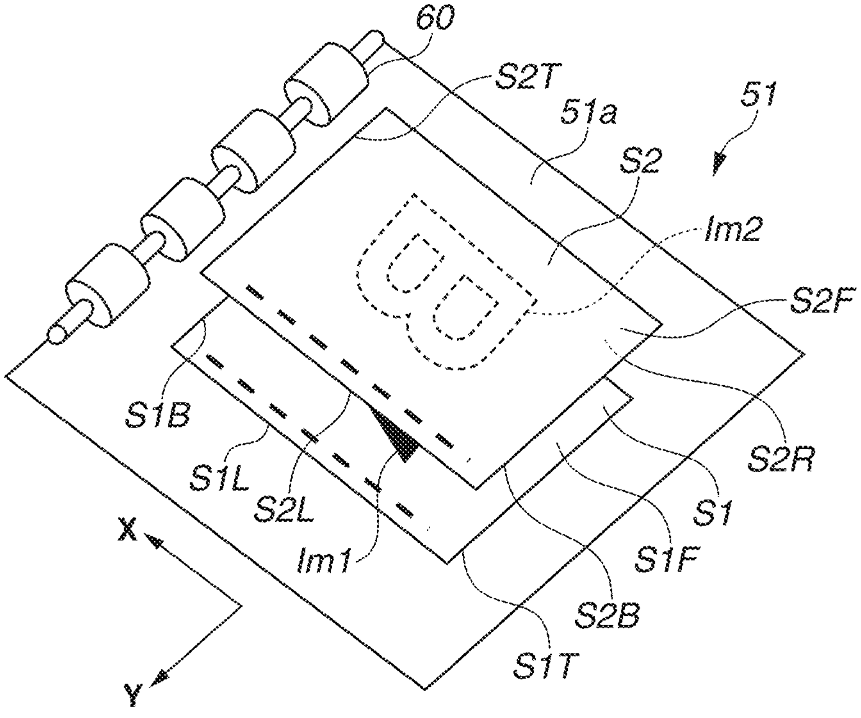

FIG. 5B is a schematic diagram illustrating the subsequent sheet S2 stacked on the binding processing portion 51 after the preceding sheet S1. An image Im2 "B" is formed on a second surface S2F, which is an image surface, of the subsequent sheet S2. Since the second surface S2R is on a surface facing backward in FIG. 5B, the image Im2 is indicated with a contour in FIG. 5B. A first surface S2F of the subsequent sheet S2 is in a blank state. The subsequent sheet S2 is stacked on the processing tray 51*a* with the second surface S2R facing downward and facing the first surface S1F of the preceding sheet S1 and the first surface S2F facing upward.

The leading edge of the subsequent sheet S2 in the sheet conveyance direction when the subsequent sheet S2 passes through the secondary transfer portion T2 for the second time will be referred to as a leading edge S2T during image transfer, and the trailing edge of the subsequent sheet S2 in the sheet conveyance direction when the subsequent sheet S2 passes through the secondary transfer portion T2 for the second time will be referred to as a trailing edge S2B during image transfer. According to the present exemplary embodiment, an image is formed on the subsequent sheet S2 when the subsequent sheet S2 passes through the secondary transfer portion T2 for the second time, and then the subsequent sheet S2 is conveyed to the sheet processing apparatus 50 without being reversed by the reverse roller pair 13. Thus, in the state where the subsequent sheet S2 is stacked on the binding processing portion 51, the leading edge of the subsequent sheet S2 in the X direction (conveyance direction to the stack discharge roller pair 60) is the leading edge S2T during image transfer, and the trailing edge of the subsequent sheet S2 in the X direction is the trailing edge S2B during image transfer.

As illustrated in FIG. 5B, in the state where the preceding sheet S1 and the subsequent sheet S2 are stacked on the binding processing portion 51, the leading edge S1T of the preceding sheet S1 during image transfer and the trailing edge S2B of the subsequent sheet S2 during image transfer face each other. In the above-described state, the trailing edge S1B of the preceding sheet S1 during image transfer and the leading edge S2T of the subsequent sheet S2 during image transfer face each other. Specifically, in the state where the preceding sheet S1 and the subsequent sheet S2 are stacked such that the image surfaces of the preceding sheet S1 and the subsequent sheet S2 become facing pages, the positional relationship between the leading and trailing edges of the preceding sheet S1 while an image is being formed on the image surface of the preceding sheet S1 is opposite to that of the subsequent sheet S2 while an image is being formed on the image surface of the subsequent sheet S2.

The binding processing portion 51 performs the binding process on the preceding sheet S1 and the subsequent sheet S2 along edge portions S1L and S2L of the preceding sheet S1 and the subsequent sheet S2 in the Y direction orthogonal to the sheet conveyance direction in the image forming apparatus 1. Thus, the leading edge S1T of the preceding sheet S1 during image transfer becomes a bottom edge (bottom) of the booklet, whereas the trailing edge S2B of the subsequent sheet S2 during image transfer becomes a top edge (top) of the booklet. In other words, the correspondence relationship between the leading and trailing edges during image transfer and the top and bottom edges in an open spread is reversed between the facing pages.

In other words, according to the present exemplary embodiment, after forming the first image on the first sheet using the image forming unit, the image forming apparatus 1 reverses and conveys the first sheet using the reversing unit and then stacks the first sheet on the stacking portion. After forming the second image on the second sheet using the image forming unit, the image forming apparatus 1 stacks the second sheet on the stacking portion without reversing and conveying the second sheet using the reversing unit. In the state where the first sheet and the second sheet are stacked, the positional relationship of the leading and trailing edges in image forming is thereby reversed between the first sheet and the second sheet.

The image Im1 is formed in an orientation with respect to the preceding sheet S1 such that the top side of the image (apex side of "A") is on the trailing edge S1B side during image transfer. On the other hand, the image Im2 is formed in an orientation with respect to the subsequent sheet S2 such that the top side of the image is on the leading edge S2T side during image transfer.

Specifically, the orientation of the image Im2 with respect to the subsequent sheet S2 is opposite the orientation of the image Im1 with respect to the preceding sheet S1 in the sheet conveyance direction (sub-scanning direction of the photosensitive drum 7). This makes it possible to align the top and bottom of the images Im1 and Im2 in an open spread of the preceding sheet S1 and the subsequent sheet S2.

According to the present exemplary embodiment, as illustrated in FIG. 5B, an image may be formed on the sheet S with the long edge leading (orientation where the longer sides are parallel to the sheet conveyance direction), and the binding processing portion 51 may perform long-edge binding to bind the plurality of sheets S together along the longer sides of the sheets S.

Image Position Misalignment

Figure 6A:
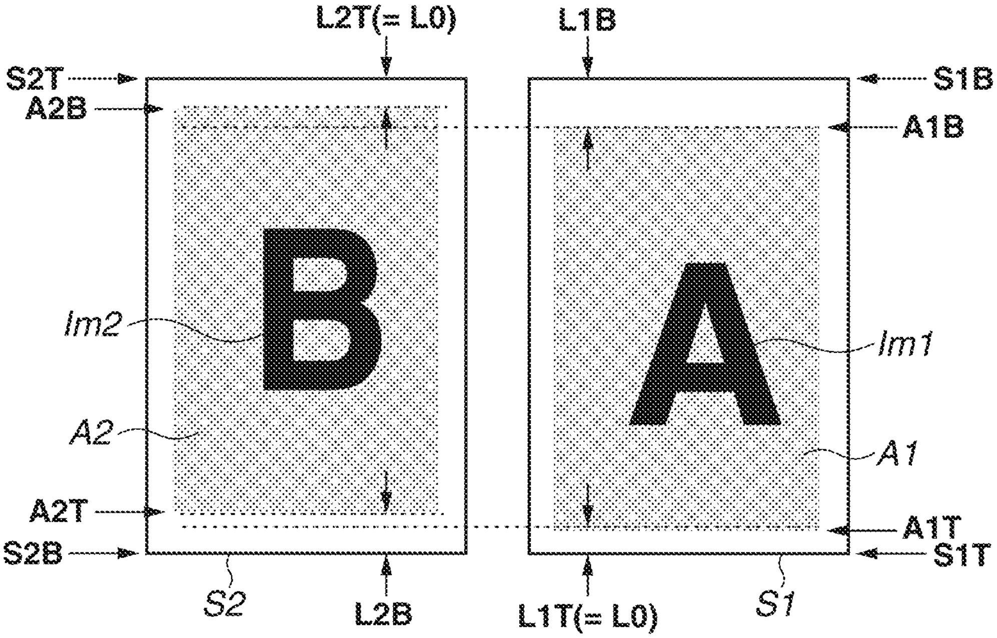
FIGS. 6A and 6B are diagrams illustrating a misalignment of image positions according to the first exemplary embodiment.
Figure 6B:
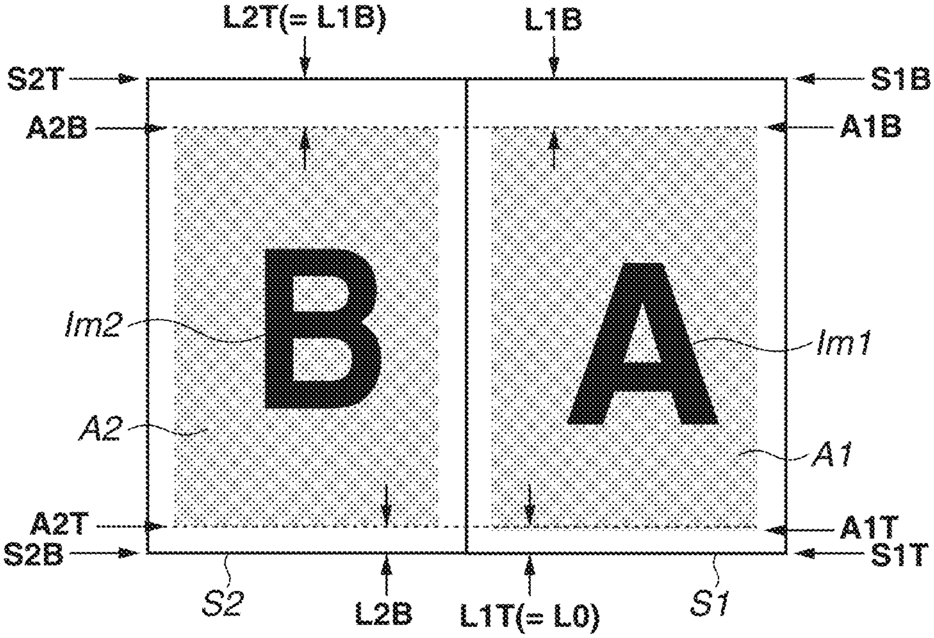

Next, why image position misalignments between facing pages occur and a method for reducing image position misalignments will be described with reference to FIGS. 6A and 6B. FIG. 6A is an overview diagram illustrating effective printing areas A1 and A2 of the image surfaces of the preceding sheet S1 and the subsequent sheet S2 in a reference example where the process according to the present exemplary embodiment is not applied. FIG. 6B is an overview diagram illustrating the effective printing areas A1 and A2 of the image surfaces of the preceding sheet S1 and the subsequent sheet S2 in a case where the process according to the present exemplary embodiment is applied. The effective printing areas A1 and A2 each refer to a maximum area where the image forming unit 2A forms an image on the sheet.

Hereinafter, an edge portion of the effective printing area A1 of the preceding sheet S1 that is on the leading edge S1T side during image transfer will be referred to as "printing area leading edge A1T", and an edge portion of the effective printing area A1 of the preceding sheet S1 that is on the trailing edge S1B side during image transfer will be referred to as "printing area trailing edge A1B". A length from the leading edge S1T of the preceding sheet S1 during image transfer to the printing area leading edge A1T will be referred to as "leading margin L1T". A length from the trailing edge S1B of the preceding sheet S1 during image transfer to the printing area trailing edge A1B will be referred to as "trailing margin L1B". An edge portion of the effective printing area A2 of the subsequent sheet S2 that is on the leading edge S2T side during image transfer will be referred to as "printing area leading edge A2T", and an edge portion of the effective printing area A2 of the subsequent sheet S2 that is on the trailing edge S2B side during image transfer will be referred to as "printing area trailing edge A2B". A length from the leading edge S2T of the subsequent sheet S2 during image transfer to the printing area leading edge A2T will be referred to as "leading margin L2T". A length from the trailing edge S2B of the subsequent sheet S2 during image transfer to the printing area trailing edge A2B will be referred to as "trailing margin L2B".

For simplification, a case will be described where a booklet is generated using a preset target value L0 for the leading margins L1T and L2T and the trailing margins L1B and L2B.

In a case where the images Im1 and Im2 illustrated in FIG. 6A are formed, the trailing margin L1B of the preceding sheet S1 and the leading margin L2T of the subsequent sheet S2 desirably correspond to each other in an open spread of the image surfaces of the preceding sheet S1 and the subsequent sheet S2. The leading margin L1T of the preceding sheet S1 and the trailing margin L2B of the subsequent sheet S2 desirably correspond to each other. In this case, a high-quality booklet with the aligned top and bottom positions of the images Im1 and Im2 in an open spread is generated.

However, there may be a case where the trailing margin L1B of the preceding sheet S1 and the leading margin L2T of the subsequent sheet S2 fail to correspond to each other, and the leading margin L1T of the preceding sheet S1 and the trailing margin L2B of the subsequent sheet S2 fail to correspond to each other for the following reason.

First, in a case where the sheet conveyance direction in forming the images Im1 and Im2 is considered, the trailing margin L1B of the preceding sheet S1 is the margin on the trailing edge S1B side during image transfer, whereas the leading margin L2T of the subsequent sheet S2 is the margin on the leading edge S2T side during image transfer.

In the reference example in FIG. 6A, leading edge registration is performed on each sheet based on the target value L0, and the leading margins L1T and L2T of the preceding sheet S1 and the subsequent sheet S2 are both adjusted to the target value L0. In other words, the control unit 85 determines exposure drawing start timings based on timings of detection of leading edges of the sheets by the sheet detection unit 81 so that the leading margins L1T and L2T become the target value L0.

By appropriately setting a magnification of an electrostatic latent image in the sub-scanning direction that the laser scanner 8 forms on the photosensitive drum 7, the trailing margin L2B of the subsequent sheet S2 corresponding to the leading margin L1T of the preceding sheet S1 also ideally becomes the target value L0.

However, in reality, the trailing margin L1B of the preceding sheet S1 becomes a value deviated from L0 due to various reasons. For example, a change timing of a detection signal of the sheet detection unit 81 in response to passage of the leading edge of the preceding sheet S1 may vary relatively to the actual timing of passage of the leading edge of the preceding sheet S1 through the detection position of the sheet detection unit 81. The time from the passage of the leading edge of the preceding sheet S1 through the sheet detection unit 81 to the passage of the trailing edge of the preceding sheet S1 through the sheet detection unit 81 may also vary due to a change in conveyance speed of the preceding sheet S1.

In a case where the trailing margin L1B of the preceding sheet S1 deviates from L0 due to the reason described above, the trailing margin L1B of the preceding sheet S1 and the leading margin L2T of the subsequent sheet S2 may not correspond to each other, and the booklet quality may decrease. For the same reason, when the trailing margin L2B of the subsequent sheet S2 deviates from L0, the leading margin L1T of the preceding sheet S1 and the trailing margin L2B of the subsequent sheet S2 may not correspond to each other, and thus the booklet quality may decrease.

The variation in the trailing margins L1B and L2B is caused by the combined effects of various factors, such as variation in the printing area leading edges A1T and A2T, wear of the conveyance roller pair 6, and part tolerances and assembly tolerances of the sheet detection unit 81 and the conveyance roller pair 6. It is therefore difficult to match the trailing margins L1B and L2B exactly to the target value L0 of the leading margins L1T and L2T.

According to the present exemplary embodiment, the position of the printing area leading edge A2T of the subsequent sheet S2 is therefore corrected based on the detection result of the trailing edge S1B of the preceding sheet S1 during image transfer by the sheet detection unit 81.

In other words, the control unit 85 as the alignment unit according to the present exemplary embodiment corrects the position of the second image with respect to the leading edge of the second sheet during formation of the second image based on the detection result of the trailing edge of the first sheet by the detection unit during formation of the first image. This makes it possible to reduce a misalignment between the leading margin of the first sheet and the trailing margin of the second sheet and to improve the booklet quality.

More specifically, the control unit 85 calculates the trailing margin L1B of the preceding sheet S1 based on the detection result of the trailing edge S1B of the preceding sheet S1 during image transfer by the sheet detection unit 81. The control unit 85 calculates a difference (trailing edge misalignment amount) between the calculated trailing margin L1B and a target value (that is L0 herein) of the trailing margin L1B. The control unit 85 then shifts the position of the printing area leading edge A2T of the subsequent sheet S2 by the trailing edge misalignment amount of the preceding sheet S1 at a time of performing the leading edge registration on the subsequent sheet S2. Specifically, the control unit 85 determines the value obtained by correcting the target value L0 of the leading margin based on the trailing edge misalignment amount of the preceding sheet S1 as a target value of the leading margin L2T of the subsequent sheet S2.

This makes it possible to align the leading margin L2T of the subsequent sheet S2 with the trailing margin L1B of the preceding sheet S1 as illustrated in FIG. 6B, making it possible to improve the quality of facing pages.

Booklet Generation Job Execution Process

Figure 7:
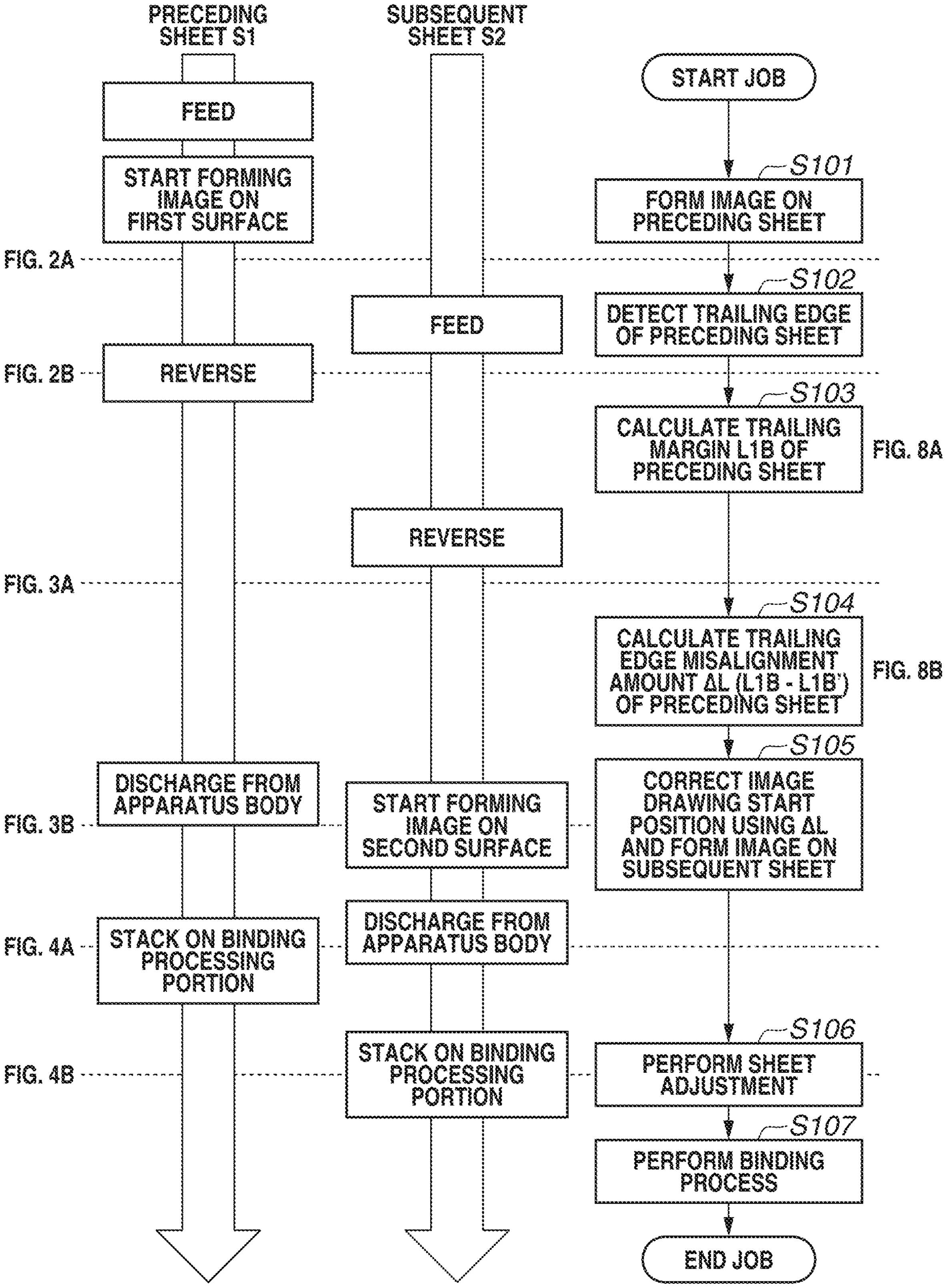
FIG. 7 is a diagram illustrating a booklet generation job execution process according to the first exemplary embodiment.
Figure 8A:
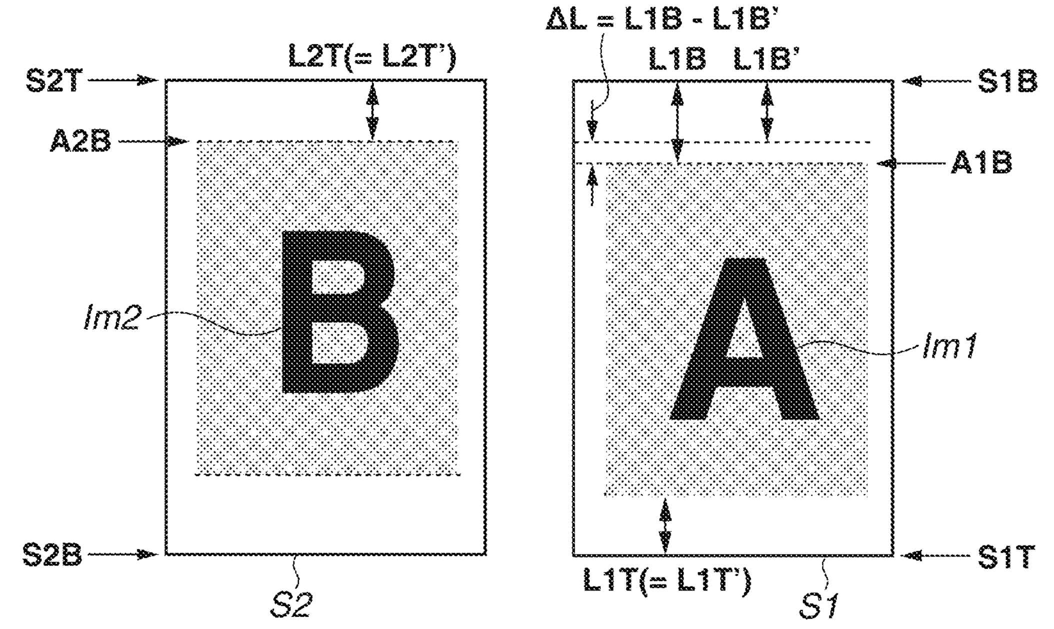
FIGS. 8A and 8B are diagrams illustrating image positions according to the first exemplary embodiment.
Figure 8B:
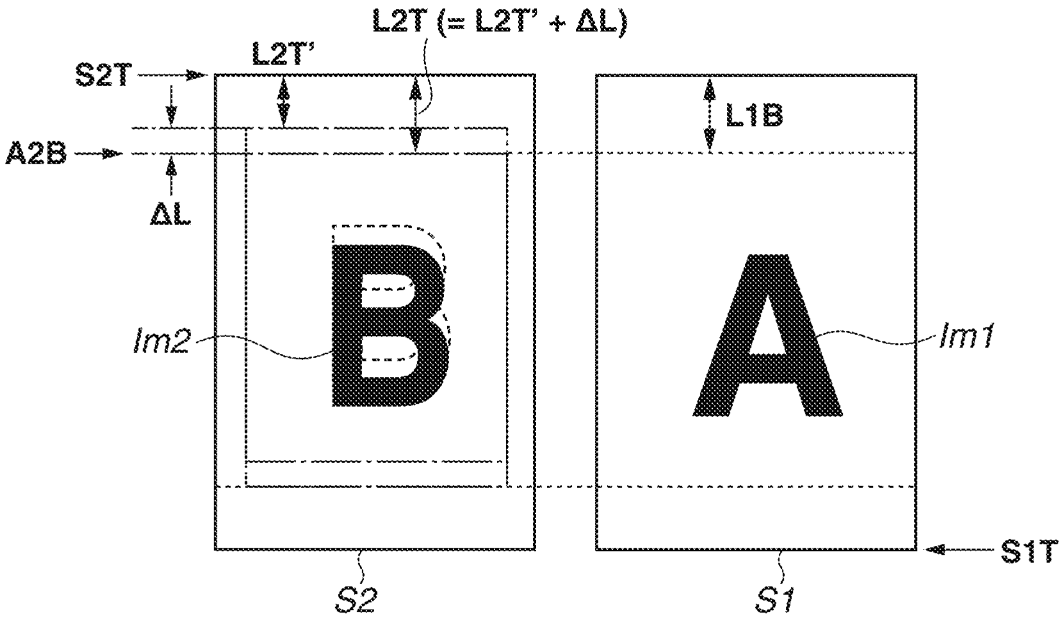

An example of a booklet generation job execution process according to the present exemplary embodiment will be described with reference to FIGS. 7, 8A, and 8B. FIG. 7 illustrates processes performed on the preceding sheet S1 and the subsequent sheet S2 in the booklet generation job in chronological order and a flowchart illustrating a process of the booklet generation job. The steps (steps S101 to S107) in the flowchart are realized by the control unit 85 of the image forming apparatus 1. FIGS. 8A and 8B are overview diagrams illustrating the effective printing areas A1 and A2 of the preceding sheet S1 and the subsequent sheet S2.

If the booklet generation job is started, feeding of the preceding sheet S1 is started. In step S101, the image Im1 is formed on the first surface of the preceding sheet S1 (FIG. 2A). At this time, the leading edge registration of the preceding sheet S1 is performed so that the leading margin L1T of the preceding sheet S1 becomes a preset target value L1T'. The target value L1T' is preset based on settings information about the booklet generation job.

Thereafter, the preceding sheet S1 is reversed and conveyed by the reverse roller pair 13 (FIG. 2B), discharged from the apparatus body 2 to the sheet processing apparatus 50 (FIG. 3B), and stacked on the binding processing portion 51 (FIG. 4A). It is to be noted that FIG. 7 is not intended to specify the chronological order of processes of the conveyance operation after the image formation on the first surface of the preceding sheet S1 and processes of steps S103 to S105.

In step S102, a trailing edge (i.e., the trailing edge S1B during image transfer) of the preceding sheet S1 during formation of the image Im1 on the first surface of the preceding sheet S1 is detected by the sheet detection unit 81. In step S103, the trailing margin L1B of the preceding sheet S1 is calculated based on the detection timing of the trailing edge S1B of the preceding sheet S1 during image transfer by the sheet detection unit 81 and a designated image drawing end timing on the first surface of the preceding sheet S1. FIG. 8A is an overview diagram illustrating the parameter (trailing margin L1B) calculated in step S103.

The designated image drawing end timing on the first surface of the preceding sheet S1 refers to a completion timing (exposure end timing) of exposure of an area on the photosensitive drum 7 corresponding to the printing area trailing edge A1B by the laser scanner 8. A specific example of the calculation of the trailing margin L1B based on the detection timing of the trailing edge S1B by the sheet detection unit 81 and the designated image drawing end timing is as follows. First, a first timing of arrival of an exposure end position on the photosensitive drum 7 at the secondary transfer portion T2 is calculated based on the designated image drawing end timing and the rotation speed of the photosensitive drum 7. Further, a second timing of arrival of the trailing edge S1B at the secondary transfer portion T2 is calculated based on the detection timing of the trailing edge S1B by the sheet detection unit 81 and a designated sheet conveyance speed (process speed) at the secondary transfer portion T2. The product of a difference between the first timing and the second timing and the process speed may be determined as the trailing margin L1B of the preceding sheet S1. In reality, a calculation formula that produces the same result as the foregoing calculation process may be established in advance, and the calculation may be performed by substituting the detection timing and the image drawing end timing into the calculation formula.

The left side of FIG. 8A illustrates the leading margin L2T in a case where the leading edge registration is not corrected for the subsequent sheet S2. In this case, the printing area leading edge A2T of the subsequent sheet S2 is aligned with a position where the leading margin L2T becomes a target value L2T'. The target value L2T' is preset based on the settings information about the booklet generation job.

In step S104, a difference (trailing edge misalignment amount ΔL) between the calculated trailing margin L1B and a target value L1B' of the trailing margin L1B is calculated. Specifically, ΔL=L1B−L1B'. In other words, the control unit 85 as the alignment unit calculates a difference between the trailing margin of the first sheet and the target value, based on the detection timing of the trailing edge of the first sheet by the detection unit and an end timing of formation of the electrostatic latent image by the exposure unit. The target value L1B' is preset based on the settings information about the booklet generation job.

The subsequent sheet S2 is fed following the preceding sheet S1, passes through the secondary transfer portion T2 without image transfer (FIG. 2B), and is then reversed and conveyed by the reverse roller pair 13 (FIG. 3A). It is to be noted that FIG. 7 is not intended to specify the chronological order of processes of the conveyance operation before the image formation on the second surface of the subsequent sheet S2 and processes of steps S101 to S104.

In step S105, the image Im2 is formed on the second surface of the subsequent sheet S2. At this time, the target value of the leading margin L2T of the subsequent sheet S2 is corrected using the trailing edge misalignment amount ΔL calculated in step S104. In other words, the control unit 85 as the alignment unit corrects the leading margin of the second sheet from the target value by the difference between the trailing margin of the first sheet and the target value.

FIG. 8B is an overview diagram illustrating the parameter (trailing edge misalignment amount ΔL) calculated in step S104 and a correction amount of leading edge registration for the subsequent sheet S2. As illustrated in FIG. 8B, the position of the printing area leading edge A2T, which is a reference position on the leading edge side of the image Im2 to be formed on the subsequent sheet S2, is corrected by the same amount as the trailing edge misalignment amount ΔL generated on the preceding sheet S1. By using this correction, the target value of the leading margin L2T in the leading edge registration of the subsequent sheet S2 becomes L2T'+ΔL.

Thereafter, the subsequent sheet S2 is discharged from the apparatus body 2 to the sheet processing apparatus 50 (FIG. 4A) and stacked on the binding processing portion 51 (FIG. 4B). In step S106, the binding processing portion 51 adjusts the preceding sheet S1 and the subsequent sheet S2 in the X and Y directions. In step S107, the binding process is performed on the preceding sheet S1 and the subsequent sheet S2. The completed booklet is then discharged by the stack discharge roller pair 60, and the booklet generation job ends.

Advantages of Present Exemplary Embodiment

According to the present exemplary embodiment as described above, an output item with the preceding sheet S1 and the subsequent sheet S2 stacked such that surfaces that are to form facing pages and on which the images Im1 and Im2 are formed to face each other is generated. In the output item, the trailing edge S1B of the preceding sheet S1 during image transfer faces the leading edge S2T of the subsequent sheet S2 during image transfer. The control unit 85 then corrects the position of the printing area leading edge A2T corresponding to the leading edge S2T of the subsequent sheet S2 during image transfer based on the detection result of the trailing edge S1B of the preceding sheet S1 during image transfer by the sheet detection unit 81.

In other words, the image forming apparatus 1 generates an output item in which a first sheet with a first image formed thereon by the image forming unit and a second sheet with a second image formed thereon by the image forming unit are stacked. In the output item, the surface with the first image of the first sheet and the surface with the second image of the second sheet face each other, and a trailing edge of the first sheet during formation of the first image and a leading edge of the second sheet during formation of the second image face each other. The alignment unit then corrects the position of the second image with respect to the leading edge of the second sheet during formation of the second image based on the detection result of the trailing edge of the first sheet during formation of the first image by the detection unit.

This makes it possible to align the positions of the first image and the second image in an open spread of the output item where the first sheet and the second sheet are stacked, making it possible to improve the quality of the output item.

While the leading margin L1T of the preceding sheet S1 is adjusted to the preset target value, the leading edge registration of the subsequent sheet S2 is performed such that the trailing margin L2B of the subsequent sheet S2 becomes equal to the trailing margin L1B of the preceding sheet S1. In other words, the first image is aligned with the leading edge of the first sheet so that the leading margin of the first sheet becomes the preset target value. The second image is also aligned with the leading edge of the second sheet so that the leading margin of the second sheet becomes equal to the trailing margin of the first sheet. This makes it possible to align the trailing margin L1B of the preceding sheet S1 with the leading margin L2T of the subsequent sheet S2 in an open spread.

According to the present exemplary embodiment, an example of equalizing the trailing margin L2B of the subsequent sheet S2 with the trailing margin L1B of the preceding sheet S1 is described, however, the trailing margin L2B of the subsequent sheet S2 may be set to a value different from the trailing margin L1B of the preceding sheet S1 depending on the purpose of use of the output item.

As illustrated in FIG. 6A, the binding process is performed on the preceding sheet S1 and the subsequent sheet S2. In other words, a binding processing portion is further included for binding the first sheet and the second sheet together so that the surface with the first image of the first sheet and the surface with the second image of the second sheet form facing pages. This makes it possible to generate a booklet with the trailing margin L1B of the preceding sheet S1 aligned with the leading margin L2T of the subsequent sheet S2 in an open spread. Specifically, it is possible to provide an image forming apparatus 1 capable of generating an output item by performing the binding process on facing pages with image positions aligned with each other.

Modified Examples

While an example of a case of generating a booklet with two sheets according to the present exemplary embodiment is described above, a booklet with three or more sheets may be generated by the booklet generation job. Even in this case, the process according to the present exemplary embodiment is applicable to a sheet (first sheet) on which an image (first image) is formed first in a booklet and a sheet (second sheet) on which an image (second image) is formed after the first image and that forms facing pages together with the first sheet. In other words, for each set of two sheets that are to form facing pages among the three or more sheets, the alignment unit corrects an image position with respect to a leading edge of one of the two sheets during formation of an image of one of the facing pages on the sheet by the image forming unit based on a detection result of a trailing edge of the other one of the two sheets by the detection unit during formation of the other image of the other one of the facing pages on the other sheet by the image forming unit. This makes it possible to generate a booklet with image positions aligned with each other on the facing pages of the booklet.

While an example of forming no images on front and back covers of a booklet according to the present exemplary embodiment is described above, a booklet with an image formed on front and back covers can also be generated. For example, in the process of the booklet generation job illustrated in FIG. 7, an image may be formed on the second surface of the preceding sheet S1, and an image may be formed on the first surface of the subsequent sheet S2.

While an example is described above of conveying the subsequent sheet S2 through the secondary transfer portion T2 without transferring an image to the first surface of the subsequent sheet S2, reversing and conveying the subsequent sheet S2, and then transferring an image to the second surface of the subsequent sheet S2 according to the present exemplary embodiment, the first surface of the subsequent sheet S2 may be determined as an image surface. For example, in the process of the booklet generation job illustrated in FIG. 7, an image may be transferred to the first surface when the subsequent sheet S2 passes through the secondary transfer portion T2 for the first time ("transfer an image to the first surface" instead of "transfer an image to the second surface"). In this case, the subsequent sheet S2 with the transferred image on the first surface is discharged from the apparatus body 2 to the sheet processing apparatus 50 (FIG. 4A) without being reversed and conveyed by the reverse roller pair 13 and is stacked on the binding processing portion 51 (FIG. 4B). The present modified example produces an advantage similar to that of the present exemplary embodiment by correcting the target value of the leading edge registration during formation of an image on the first surface of the subsequent sheet S2 based on the trailing edge misalignment amount ΔL of the preceding sheet S1.

As an advantage of the present modified example, the number of processes in the conveyance operation of the subsequent sheet S2 decreases (sequence becomes a one-sided printing sequence), so that the productivity of the booklet generation job improves because of, for example, the decreased standby time of the preceding sheet S1 in the state in FIG. 2B.

While the first surface (image transfer surface during passage through the secondary transfer portion T2 for the first time after sheet feeding) of the preceding sheet S1 is determined as an image surface of the facing pages according to the present exemplary embodiment, the second surface of the preceding sheet S1 may be determined as an image surface of the facing pages. Specifically, although the productivity decreases, the number of reverses in the apparatus body 2 may be increased to transfer an image to the second surface of the preceding sheet S1 after the preceding sheet S1 passes through the secondary transfer portion T2 without image transfer to the first surface and is reversed and conveyed. The present modified example produces an advantage similar to that of the present exemplary embodiment by correcting the target value of the leading edge registration during image formation on the subsequent sheet S2 based on the trailing edge misalignment amount ΔL during image formation on the second surface of the preceding sheet S1.

The terms "preceding sheet S1" and "subsequent sheet S2" according to the present exemplary embodiment do not refer to an order of pages in a generated booklet. For example, in the open spread illustrated in FIG. 6B, the page with the image Im2 of the subsequent sheet S2 may be a page that is to be read before the page with the image Im1 of the preceding sheet S1. Similarly, the terms "first sheet" and "second sheet" do not refer to an order of pages in a generated output item.

For example, in FIG. 5A, the binding process may be performed along edge portions on the opposite side to the edge portions S1L and S2L of the preceding sheet S1 and the subsequent sheet S2 in the X direction. In this case, a booklet with the images Im1 and Im2 reversed in an open spread, compared to the example in FIG. 6A, is generated.

An image forming apparatus according to a second exemplary embodiment with a different layout from the apparatus body 2' according to the first exemplary embodiment will be described below with reference to FIG. 10A. Each element assigned the same reference numeral as that of an element according to the first exemplary embodiment has substantially the same configuration and functions as those of the element according to the first exemplary embodiment, and mainly differences from the first exemplary embodiment will be described.

Hereinafter, discharging the sheet S with an image transferred at the secondary transfer portion T2 from the apparatus body 2 without being reversed and conveyed by the reverse roller pair 13 will be referred to as "through-discharge". According to the first exemplary embodiment illustrated in FIG. 1, the image surface is a sheet surface facing downward on the binding processing portion 51 in a case where the sheet S with an image transferred to one surface (image surface) at the secondary transfer portion T2 is through-discharged and stacked on the binding processing portion 51.

Figure 10A:
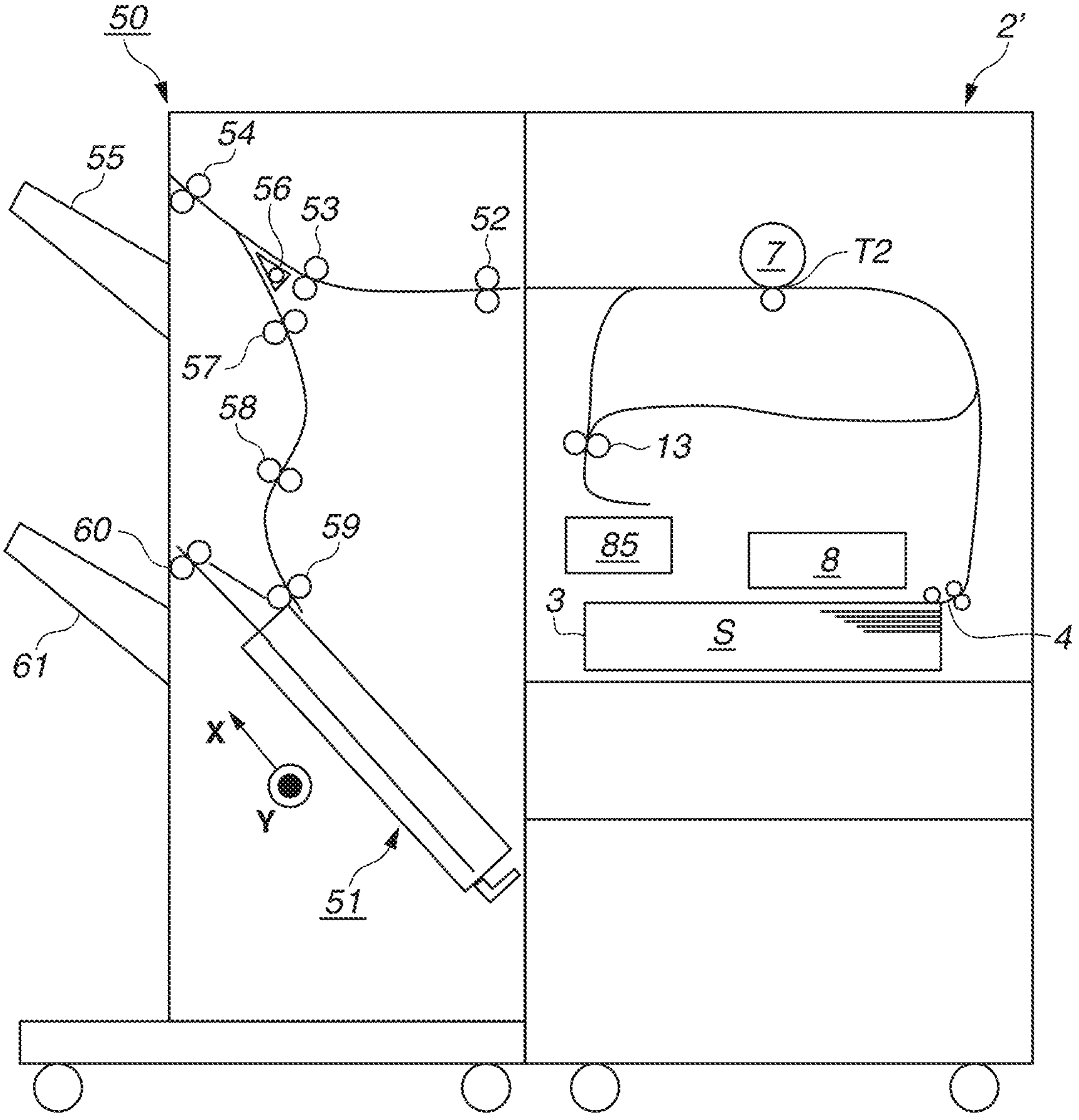
FIG. 10A is an overview diagram illustrating an image forming apparatus according to a second exemplary embodiment.

On the contrary, the image forming apparatus 1 according to the second exemplary embodiment in FIG. 10A is different in layout of the apparatus body 2' from the first exemplary embodiment. Specifically, according to the first exemplary embodiment, the sheet S with an image transferred to one surface (image surface) is through-discharged from the apparatus body 2' with the image surface facing downward. On the contrary, according to the second exemplary embodiment, the sheet S with an image transferred to one surface (image surface) is through-discharged from the apparatus body 2' with the image surface facing upward. According to the second exemplary embodiment, in a case where the sheet S with an image transferred to one surface (image surface) at the secondary transfer portion T2 is through-discharged and stacked on the binding processing portion 51, the image surface is a sheet surface facing upward on the binding processing portion 51.

In the case of the foregoing layout, facing pages with image surfaces of first and second sheets facing each other on the binding processing portion 51 may be formed as follows. Specifically, the first sheet after an image is transferred to the first surface is through-discharged and stacked on the binding processing portion 51. The second sheet after an image is transferred to the second surface is reversed and conveyed in the apparatus body 2' and then discharged and stacked on the first sheet on the binding processing portion 51.

Booklet Generation Job Execution Process

Figure 11:
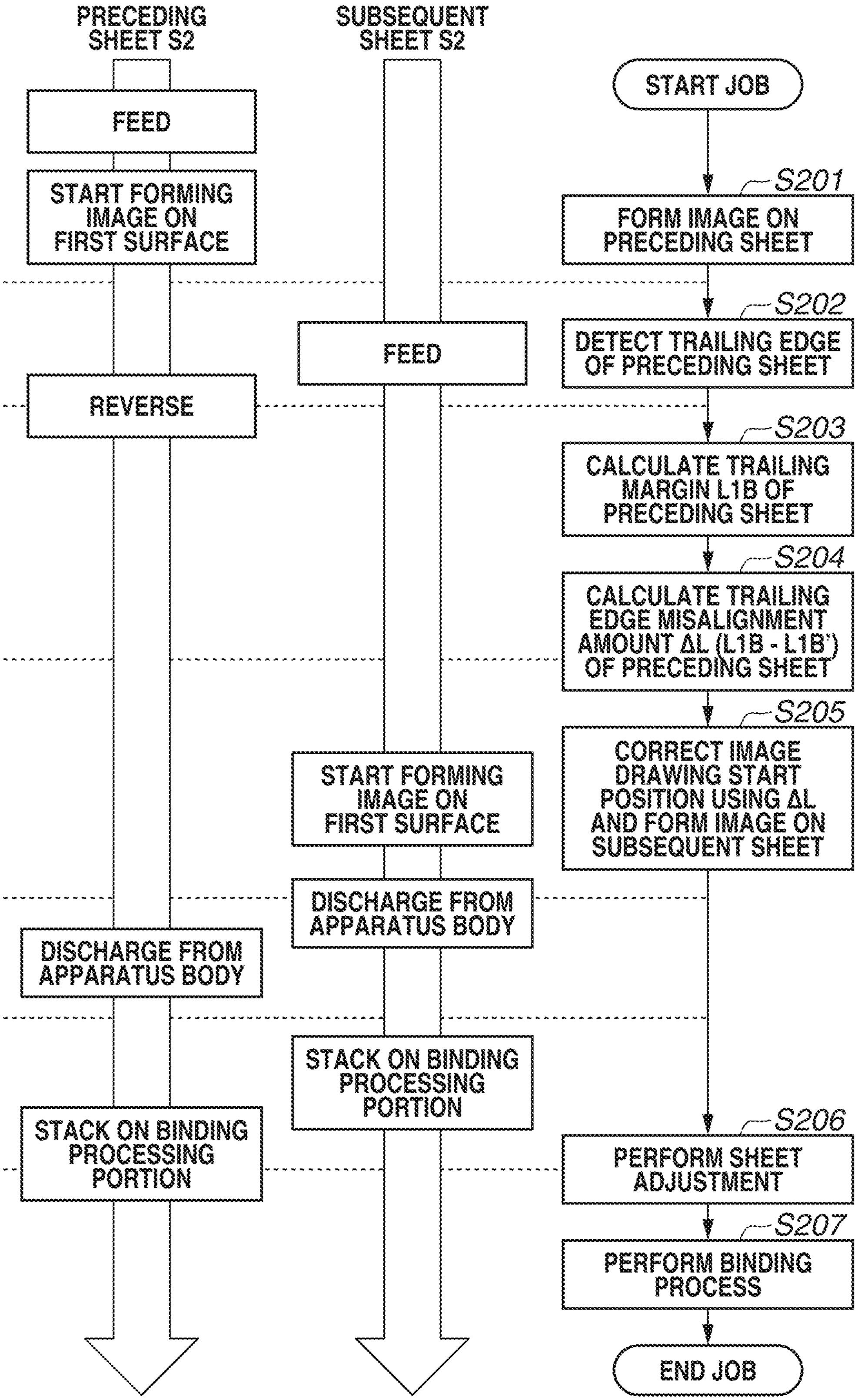
FIG. 11 is a diagram illustrating a booklet generation job execution process according to the second exemplary embodiment.

An example of a booklet generation job execution process according to the present exemplary embodiment will now be described with reference to FIG. 11. FIG. 11 illustrates processes on the preceding sheet S1 and the subsequent sheet S2 in the booklet generation job in chronological order and a flowchart illustrating a process of the booklet generation job. Steps S201 to S207 in the flowchart are realized by the control unit 85 of the image forming apparatus 1.

If the booklet generation job is started, feeding of the preceding sheet S1 is started. In step S201, an image is formed on the first surface of the preceding sheet S1. At this time, the leading edge registration of the preceding sheet S1 is performed such that the leading margin L1T of the preceding sheet S1 becomes the preset target value L1T'. The target value L1T' is set in advance based on the settings information about the booklet generation job. Thereafter, the preceding sheet S1 is reversed and conveyed by the reverse roller pair 13 and is then discharged from the apparatus body 2' to the sheet processing apparatus 50 and stacked on the binding processing portion 51.

In step S202, a trailing edge (i.e., the trailing edge S1B during image transfer) of the preceding sheet S1 during formation of the image on the first surface of the preceding sheet S1 is detected by the sheet detection unit 81. In step S203, the trailing margin L1B of the preceding sheet S1 is calculated based on the detection timing of the trailing edge S1B of the preceding sheet S1 during image transfer by the sheet detection unit 81 and a designated timing of an end of image formation on the preceding sheet S1. In step S204, a difference (trailing edge misalignment amount ΔL) between the calculated trailing margin L1B and the target value L1B' of the trailing margin L1B is calculated. Specifically, ΔL=L1B−L1B'.

The subsequent sheet S2 is fed following the preceding sheet S1. In step S205, an image is formed on the first surface of the subsequent sheet S2. At this time, the target value of the leading margin L2T of the subsequent sheet S2 is corrected by using the trailing edge misalignment amount ΔL calculated in step S204. Specifically, the position of the printing area leading edge A2T, which is a reference position on the leading edge side of the image formed on the subsequent sheet S2, is corrected by the same amount as the trailing edge misalignment amount ΔL generated on the preceding sheet S1. Through this correction, the target value of the leading margin L2T in the leading edge registration of the subsequent sheet S2 becomes L2T'+ΔL.

Thereafter, the subsequent sheet S2 is discharged from the apparatus body 2' to the sheet processing apparatus 50 and stacked on the binding processing portion 51. At this time, the first surface that is an image surface of the subsequent sheet S2 is a surface facing upward on the binding processing portion 51.

The reversed and conveyed preceding sheet S1 is discharged following the subsequent sheet S2 from the apparatus body 2' to the sheet processing apparatus 50 and stacked on the binding processing portion 51. At this time, the first surface that is an image surface of the preceding sheet S1 is a surface facing downward on the binding processing portion 51 and faces the image surface of the subsequent sheet S2.

In step S206, the binding processing portion 51 adjusts the preceding sheet S1 and the subsequent sheet S2 in the X and Y directions. In step S207, the binding process is performed on the preceding sheet S1 and the subsequent sheet S2. The completed booklet is then discharged by the stack discharge roller pair 60, and the booklet generation job ends.

According to the present exemplary embodiment, the preceding sheet S1 is reversed and conveyed after image transfer and is then stacked on the binding processing portion 51, whereas the subsequent sheet S2 is stacked on the binding processing portion 51 without being reversed and conveyed after image transfer. In other words, the image forming apparatus 1 stacks the first sheet on the stacking portion without reversing and conveying the first sheet using the reversing unit after forming the first image on the first sheet using the image forming unit. The image forming apparatus 1 also reverses and conveys the second sheet using the reversing unit and then stacks the second sheet on the stacking portion after forming the second image on the second sheet using the image forming unit.

As described above in the first exemplary embodiment with reference to FIG. 5B, the trailing edge of the preceding sheet S1 during image transfer faces the leading edge of the subsequent sheet S2 during image transfer on the binding processing portion 51. Thus, in a case where no correction is performed when the leading edge registration of the subsequent sheet S2 is to be performed, the leading margin L1T of the preceding sheet S1 and the trailing margin L2B of the subsequent sheet S2 may not correspond to each other, and the quality of the booklet may decrease (refer to FIG. 6B).

According to the present exemplary embodiment, the control unit 85 corrects the position of the printing area leading edge A2T with respect to the leading edge S2T of the subsequent sheet S2 during image transfer based on the detection result of the trailing edge S1B of the preceding sheet S1 during image transfer by the sheet detection unit 81. In other words, the alignment unit corrects the position of the second image with respect to the leading edge of the second sheet during formation of the second image based on the detection result of the trailing edge of the first sheet during formation of the first image by the detection unit.

This makes it possible for the image forming apparatus 1 having a layout of the apparatus body 2' different from that of the first exemplary embodiment to produce an advantage similar to that of the first exemplary embodiment.

Modified Examples

Figure 10B:
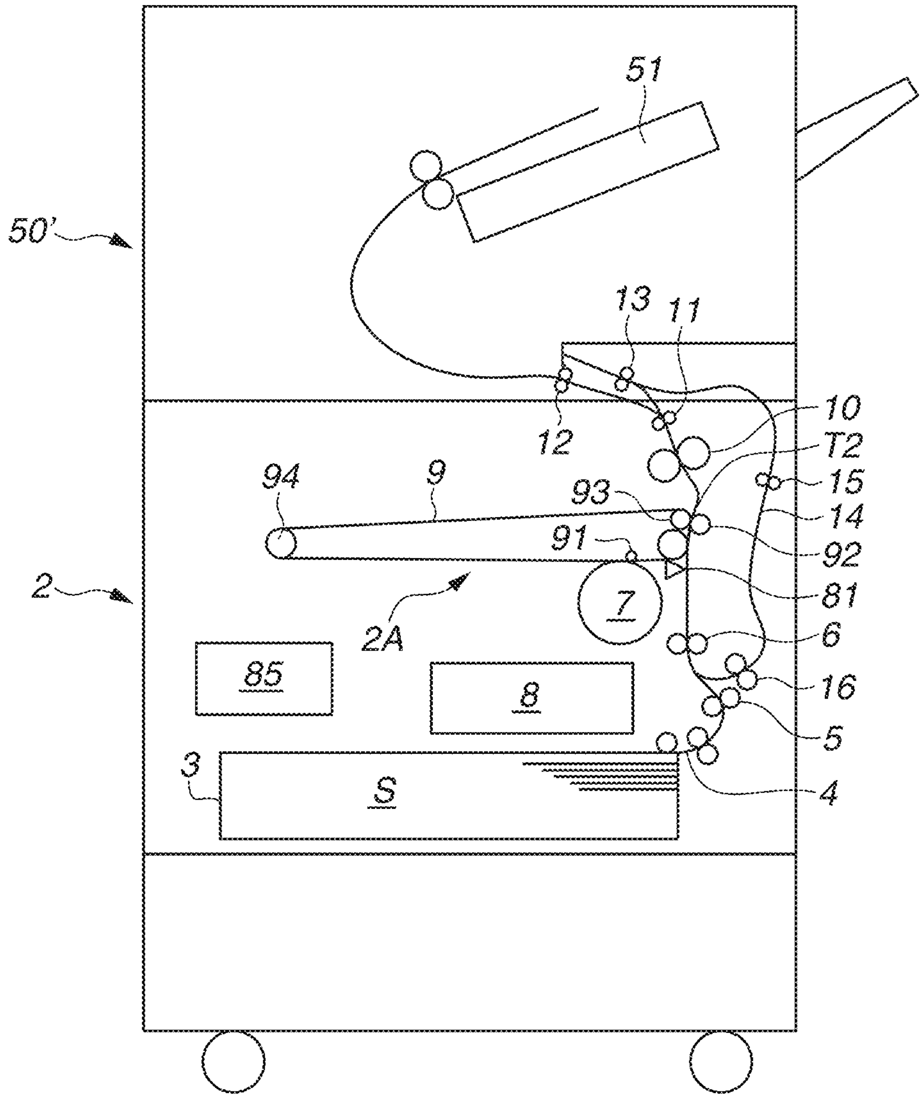
FIG. 10B is an overview diagram illustrating an image forming apparatus according to an image forming apparatus according to a modified example.

While an example of a configuration with a different layout of the apparatus body 2' from the first exemplary embodiment according to the second exemplary embodiment is described above, the layout of the sheet processing apparatus 50' may be different from that of the first exemplary embodiment. The image forming apparatus 1 according to the modified example illustrated in FIG. 10B is different from that of the first exemplary embodiment in layout of the sheet processing apparatus 50', and a sheet surface facing upward during discharge from the apparatus body 2 becomes a sheet surface facing downward in the state of being stacked on the binding processing portion 51. According to the present modified example, as in the second exemplary embodiment, the image surface therefore becomes a sheet surface facing upward on the binding processing portion 51 in a case where the sheet S with an image transferred to one surface (image surface) at the secondary transfer portion T2 is through-discharged and stacked on the binding processing portion 51.

According to the present modified example, a booklet generation job may be executed using an execution process similar to that illustrated in FIG. 11. In this case, the control unit 85 corrects the position of the printing area leading edge A2T with respect to the leading edge S2T of the subsequent sheet S2 during image transfer based on the detection result of the trailing edge S1B of the preceding sheet S1 during image transfer by the sheet detection unit 81. This makes it possible for the image forming apparatus 1 with a layout of the sheet processing apparatus 50' different from that of the first exemplary embodiment to produce an advantage similar to that of the first exemplary embodiment.

Other Modified Examples

While a stapler is described as an example of a binding mechanism of the binding processing portion 51 according to the exemplary embodiments described above, the binding mechanism is not limited to that described above. For example, a binding mechanism may be used that heats and presses a stack of sheets with a powder adhesive applied thereto using a heating plate including a heater so that the powder adhesive is melted to bond the sheets together. The powder adhesive may be the same as toner (printing toner, color toner) for use in image forming. The stapler may be a stapler that performs binding using staples or a stapler that performs stapleless binding. A stapleless binding method may be a method in which a portion of a sheet stack is cut and folded back to form a folded-back portion and the sheets are bound together using the folded-back portion, or a stapleless binding method in which a sheet stack is held with teeth having irregularities to entangle fibers of the sheets with each other and compress the fibers.

While examples of performing the binding process in the sheet processing apparatus 50 connected to the apparatus body 2 according to the exemplary embodiments are described above, a stacking portion (buffer) for sheet stacking may be provided in the apparatus body 2, and the binding process may be performed on the stacking portion.

While the image forming apparatus 1 performs the image forming through the binding process in one stop in the above-described examples according to the exemplary embodiments, a user may perform the binding process. Specifically, the image forming apparatus 1 may generate an output item in which a first sheet with a first image formed thereon by the image forming unit and a second sheet with a second image formed thereon by the image forming unit are stacked and the first sheet and the second sheet are not bound together. In the output item, the surface with the first image of the first sheet and the surface with the second image of the second sheet face each other, and a trailing edge of the first sheet during formation of the first image and a leading edge of the second sheet during formation of the second image face each other. Even in this case, an advantage similar to that of the exemplary embodiments is produced by correcting the position of the second image with respect to the leading edge of the second sheet during formation of the second image based on the detection result of the trailing edge of the first sheet during formation of the first image by the detection unit.

According to the exemplary embodiments, a sensor that detects whether there is a sheet at the detection position on the sheet conveyance path is described above as an example of the sheet detection unit 81. This is not a limiting example, and the sheet detection unit 81 may be, for example, a line sensor including a detection area extending in a direction (main scanning direction, sheet width direction) orthogonal to the sheet conveyance direction. The line sensor may also function as a horizontal registration detection unit that detects sheet positions to perform image alignment (horizontal registration) in the sheet width direction.

The number or arrangement of the sheet detection units 81 may also be changed. For example, two or more sheet detection portions may be arranged at distant locations in the sheet conveyance direction, and the sheet conveyance speed may be calculated based on the time difference between the detection timing of the leading edge of a sheet and the detection timing of the trailing edge of the sheet. In such a case, the calculation accuracy increases in a case where the trailing margin L1B of the preceding sheet S1 is calculated based on the detection result of the trailing edge S1B of the preceding sheet S1 during image transfer by the sheet detection unit 81.

Specifically, the sheet conveyance speed calculated using a plurality of sheet detection portions may be used in place of the designated sheet conveyance speed at the secondary transfer portion T2 in the above-described calculation example. This makes it possible to calculate the trailing margin L1B of the preceding sheet S1 with greater accuracy even in a case where the sheet conveyance speed varies due to conditions, such as differences in conveyance resistance due to sheet material and wear of the conveyance rollers.

While the image forming unit 2A of the intermediate transfer type is described above as an example of an image forming unit according to the exemplary embodiments, an image forming unit of a direct transfer type that transfers a toner image to the sheet S directly from the photosensitive drum 7 (image bearing member) may be used. Not only an electrophotographic method but also, for example, an inkjet method of forming an image on the sheet S by ejecting ink from nozzles may be used. In this case, the term "image forming portion" refers to a portion where the sheet S faces the nozzles on the sheet conveyance path.

Embodiments of the present disclosure can also be realized by a process in which a program for realizing one or more functions of the above-described exemplary embodiments is supplied to a system or an apparatus via a network or a storage medium and one or more processors of a computer of the system or the apparatus read the program and execute the read program. Embodiments of the present disclosure can also be realized by a circuit (e.g., application-specific integrated circuit (ASIC)) that realizes the one or more functions.

Summary of Present Disclosure

The present disclosure includes at least the following configurations or methods.

Configuration 1

An image forming apparatus comprising:

an image forming unit configured to form an image on a sheet at an image forming portion;

a reversing unit configured to reverse the sheet having passed through the image forming portion to convey the sheet to the image forming portion again;

a detection unit configured to detect a leading edge of the sheet and a trailing edge of the sheet in a sheet conveyance direction; and an alignment unit configured to align the image that the image forming unit forms on the sheet with the leading edge of the sheet based on a detection result of the leading edge of the sheet by the detection unit, the image forming apparatus being configured to generate an output item in which a first sheet with a first image formed thereon by the image forming unit and a second sheet with a second image formed thereon by the image forming unit are stacked, a surface with the first image of the first sheet and a surface with the second image of the second sheet face each other, and a trailing edge of the first sheet during formation of the first image and a leading edge of the second sheet during formation of the second image face each other, wherein the alignment unit corrects a position of the second image with respect to the leading edge of the second sheet during formation of the second image based on a detection result of the trailing edge of the first sheet by the detection unit during formation of the first image.

Configuration 2

The image forming apparatus according to Configuration 1, wherein the alignment unit aligns the first image with respect to a leading edge of the first sheet such that a leading margin of the first sheet becomes a preset target value, and wherein the alignment unit aligns the second image with respect to a leading edge of the second sheet such that a leading margin of the second sheet becomes equal to a trailing margin of the first sheet, the leading margin being a length from the leading edge of the sheet in the sheet conveyance direction to a leading edge of an effective printing area in the sheet conveyance direction, the effective printing area being a maximum area where the image forming unit forms the image on the sheet, and the trailing margin being a length from the trailing edge of the sheet in the sheet conveyance direction to a trailing edge of the effective printing area in the sheet conveyance direction.

Configuration 3

The image forming apparatus according to Configuration 2, wherein the image forming unit includes an image bearing member and an exposure unit configured to form an electrostatic latent image on the image bearing member by exposing the image bearing member, wherein the alignment unit calculates a difference between the trailing margin of the first sheet and the target value based on a detection timing of the trailing edge of the first sheet by the detection unit and an end timing of the formation of the electrostatic latent image by the exposure unit, and wherein the alignment unit corrects the leading margin of the second sheet from the target value by the difference.

Configuration 4

The image forming apparatus according to any one of Configurations 1 to 3, wherein the image forming unit includes an image bearing member and an exposure unit configured to form an electrostatic latent image on the image bearing member by exposing the image bearing member, and wherein the alignment unit adjusts a start timing of the formation of the electrostatic latent image by the exposure unit.

Configuration 5

The image forming apparatus according to any one of Configurations 1 to 3, wherein the image forming unit includes an image bearing member and a transfer unit configured to transfer a toner image formed on the image bearing member to the sheet at the image forming portion, and wherein the alignment unit adjusts an arrival timing of the leading edge of the sheet at the image forming portion.

Configuration 6

The image forming apparatus according to any one of Configurations 1 to 3, wherein the image forming unit includes an image bearing member, an exposure unit configured to form an electrostatic latent image on the image bearing member by exposing the image bearing member, and a transfer unit configured to transfer a toner image formed on the image bearing member to the sheet at the image forming portion, and wherein the alignment unit adjusts a start timing of the formation of the electrostatic latent image by the exposure unit and an arrival timing of the leading edge of the sheet at the image forming portion.

Configuration 7

The image forming apparatus according to any one of Configurations 1 to 6, further comprising an upstream roller pair situated upstream of the image forming unit in the sheet conveyance direction, wherein the detection unit detects the sheet at a position of a nip portion of the upstream roller pair in the sheet conveyance direction or at a position between the nip portion and the image forming unit.

Configuration 8

The image forming apparatus according to any one of Configurations 1 to 6, further comprising a downstream roller pair situated downstream of the image forming unit in the sheet conveyance direction, wherein the detection unit detects the sheet at a position of a nip portion of the downstream roller pair in the sheet conveyance direction or at a position between the nip portion and the image forming unit.

Configuration 9

The image forming apparatus according to any one of Configurations 1 to 8, further comprising a binding processing portion configured to bind the first sheet and the second sheet together such that the surface with the first image of the first sheet and the surface with the second image of the second sheet form facing pages.

Configuration 10

The image forming apparatus according to Configuration 9, wherein the binding processing portion binds an edge portion of the first sheet and an edge portion of the second sheet in a direction orthogonal to the sheet conveyance direction.

Configuration 11

The image forming apparatus according to Configuration 9 or 10, wherein the binding processing portion can bind three or more sheets including the first sheet and the second sheet, and wherein, for each set of two sheets that are to form facing pages among the three or more sheets, the alignment unit corrects an image position with respect to a leading edge of one of the two sheets during formation of an image of one of the facing pages on the sheet by the image forming unit based on a detection result of a trailing edge of the other one of the two sheets by the detection unit during formation of the other image of the other one of the facing pages on the other sheet by the image forming unit.

Configuration 12

The image forming apparatus according to any one of Configurations 9 to 11, wherein the binding processing portion includes a stacking portion for stacking the sheet to undergo the binding process, and wherein, after forming the first image on the first sheet using the image forming unit, the image forming apparatus reverses and conveys the first sheet using the reversing unit and stacks the first sheet on the stacking portion, and after forming the second image on the second sheet using the image forming unit, the image forming apparatus stacks the second sheet on the stacking portion without reversing and conveying the second sheet using the reversing unit.

Configuration 13

The image forming apparatus according to any one of Configurations 9 to 11, wherein the binding processing portion includes a stacking portion for stacking the sheet to undergo the binding process, and wherein, after forming the first image on the first sheet using the image forming unit, the image forming apparatus stacks the first sheet on the stacking portion without reversing and conveying the first sheet using the reversing unit, and after forming the second image on the second sheet using the image forming unit, the image forming apparatus reverses and conveys the second sheet using the reversing unit and stacks the second sheet on the stacking portion.

Configuration 14

The image forming apparatus according to any one of Configurations 1 to 13, further comprising:

a storage portion configured to store the sheet; and a sheet feed unit configured to feed the sheet singly from the storage portion to the image forming portion, wherein the first sheet is a sheet that is fed first from the storage portion, and the second sheet is a sheet that is fed after the first sheet from the storage portion.

Embodiments of the present disclosure make it possible to provide a new technique for reducing misalignments of image positions in an open spread.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-115210, filed Jul. 13, 2023, which is hereby incorporated by reference herein in its entirety.

What is claimed is:

1. An image forming apparatus comprising:

an image forming unit configured to form an image on a sheet at an image forming portion;

a reversing unit configured to reverse the sheet having passed through the image forming portion to convey the sheet to the image forming portion again;

a detection unit configured to detect a leading edge of the sheet and a trailing edge of the sheet in a sheet conveyance direction; and an alignment unit configured to align the image that the image forming unit forms on the sheet with the leading edge of the sheet based on a detection result of the leading edge of the sheet by the detection unit, the image forming apparatus being configured to generate an output item in which a first sheet with a first image formed thereon by the image forming unit and a second sheet with a second image formed thereon by the image forming unit are stacked, a surface with the first image of the first sheet and a surface with the second image of the second sheet face each other, and a trailing edge of the first sheet during formation of the first image and a leading edge of the second sheet during formation of the second image face each other, wherein the alignment unit corrects a position of the second image with respect to the leading edge of the second sheet during formation of the second image based on a detection result of the trailing edge of the first sheet by the detection unit during formation of the first image.

2. The image forming apparatus according to claim 1, wherein the alignment unit aligns the first image with respect to a leading edge of the first sheet such that a leading margin of the first sheet becomes a preset target value, and wherein the alignment unit aligns the second image with respect to a leading edge of the second sheet such that a leading margin of the second sheet becomes equal to a trailing margin of the first sheet, the leading margin being a length from the leading edge of the sheet in the sheet conveyance direction to a leading edge of an effective printing area in the sheet conveyance direction, the effective printing area being a maximum area where the image forming unit forms the image on the sheet, and the trailing margin being a length from the trailing edge of the sheet in the sheet conveyance direction to a trailing edge of the effective printing area in the sheet conveyance direction.

3. The image forming apparatus according to claim 2, wherein the image forming unit includes an image bearing member and an exposure unit configured to form an electrostatic latent image on the image bearing member by exposing the image bearing member, wherein the alignment unit calculates a difference between the trailing margin of the first sheet and the target value based on a detection timing of the trailing edge of the first sheet by the detection unit and an end timing of the formation of the electrostatic latent image by the exposure unit, and wherein the alignment unit corrects the leading margin of the second sheet from the target value by the difference.

4. The image forming apparatus according to claim 1, wherein the image forming unit includes an image bearing member and an exposure unit configured to form an electrostatic latent image on the image bearing member by exposing the image bearing member, and wherein the alignment unit adjusts a start timing of the formation of the electrostatic latent image by the exposure unit.

5. The image forming apparatus according to claim 1, wherein the image forming unit includes an image bearing member and a transfer unit configured to transfer a toner image formed on the image bearing member to the sheet at the image forming portion, and wherein the alignment unit adjusts an arrival timing of the leading edge of the sheet at the image forming portion.

6. The image forming apparatus according to claim 1, wherein the image forming unit includes an image bearing member, an exposure unit configured to form an electrostatic latent image on the image bearing member by exposing the image bearing member, and a transfer unit configured to transfer a toner image formed on the image bearing member to the sheet at the image forming portion, and wherein the alignment unit adjusts a start timing of the formation of the electrostatic latent image by the exposure unit and an arrival timing of the leading edge of the sheet at the image forming portion.

7. The image forming apparatus according to claim 1, further comprising an upstream roller pair situated upstream of the image forming unit in the sheet conveyance direction, wherein the detection unit detects the sheet at a position of a nip portion of the upstream roller pair in the sheet conveyance direction or at a position between the nip portion and the image forming unit.

8. The image forming apparatus according to claim 1, further comprising a downstream roller pair situated downstream of the image forming unit in the sheet conveyance direction, wherein the detection unit detects the sheet at a position of a nip portion of the downstream roller pair in the sheet conveyance direction or at a position between the nip portion and the image forming unit.

9. The image forming apparatus according to claim 1, further comprising a binding processing portion configured to bind the first sheet and the second sheet together such that the surface with the first image of the first sheet and the surface with the second image of the second sheet form facing pages.

10. The image forming apparatus according to claim 9, wherein the binding processing portion binds an edge portion of the first sheet and an edge portion of the second sheet in a direction orthogonal to the sheet conveyance direction.

11. The image forming apparatus according to claim 9, wherein the binding processing portion binds three or more sheets including the first sheet and the second sheet, and wherein, for each set of two sheets that are to form facing pages among the three or more sheets, the alignment unit corrects an image position with respect to a leading edge of one of the two sheets during formation of an image of one of the facing pages on the sheet by the image forming unit based on a detection result of a trailing edge of the other one of the two sheets by the detection unit during formation of the other image of the other one of the facing pages on the other sheet by the image forming unit.

12. The image forming apparatus according to claim 9, wherein the binding processing portion includes a stacking portion for stacking the sheet to undergo the binding process, and wherein, after forming the first image on the first sheet using the image forming unit, the image forming apparatus reverses and conveys the first sheet using the reversing unit and stacks the first sheet on the stacking portion, and after forming the second image on the second sheet using the image forming unit, the image forming apparatus stacks the second sheet on the stacking portion without reversing and conveying the second sheet using the reversing unit.

13. The image forming apparatus according to claim 9, wherein the binding processing portion includes a stacking portion for stacking the sheet to undergo the binding process, and wherein, after forming the first image on the first sheet using the image forming unit, the image forming apparatus stacks the first sheet on the stacking portion without reversing and conveying the first sheet using the reversing unit, and after forming the second image on the second sheet using the image forming unit, the image forming apparatus reverses and conveys the second sheet using the reversing unit and stacks the second sheet on the stacking portion.

14. The image forming apparatus according to claim 1, further comprising:

a storage portion configured to store the sheet; and a sheet feed unit configured to feed the sheet singly from the storage portion to the image forming portion, wherein the first sheet is a sheet that is fed first from the storage portion, and the second sheet is a sheet that is fed after the first sheet from the storage portion.

* * * * *